United States Patent
Vilhauer et al.

(10) Patent No.: US 9,098,280 B2
(45) Date of Patent: Aug. 4, 2015

(54) STAGED POWER DISTRIBUTION CONTROL

(71) Applicant: Intel Corporation, Santa Clara, CA (US)

(72) Inventors: Reed D. Vilhauer, Portland, OR (US); William T. Glennan, Folsom, CA (US)

(73) Assignee: INTEL CORPORATION, Santa Clara, CA (US)

( * ) Notice: Subject to any disclaimer, the term of this patent is extended or adjusted under 35 U.S.C. 154(b) by 255 days.

(21) Appl. No.: 13/729,452

(22) Filed: Dec. 28, 2012

(65) Prior Publication Data

US 2014/0189387 A1    Jul. 3, 2014

(51) Int. Cl.
*G06F 1/32* (2006.01)

(52) U.S. Cl.
CPC ................... *G06F 1/3234* (2013.01)

(58) Field of Classification Search
CPC .................................................. H01M 2220/30
USPC .......................................... 713/320; 702/63
See application file for complete search history.

(56) References Cited

U.S. PATENT DOCUMENTS

| | | | |
|---|---|---|---|
| 6,735,455 B2* | 5/2004 | Naito et al. | 455/574 |
| 8,624,624 B1* | 1/2014 | May et al. | 326/9 |
| 2008/0200220 A1* | 8/2008 | Jackson | 455/574 |
| 2009/0098914 A1* | 4/2009 | Martin-Cocher et al. | 455/572 |
| 2009/0187780 A1* | 7/2009 | Keohane et al. | 713/324 |
| 2010/0145643 A1* | 6/2010 | Katpelly et al. | 702/63 |
| 2014/0189387 A1* | 7/2014 | Vilhauer et al. | 713/320 |

\* cited by examiner

*Primary Examiner* — Vincent Tran
(74) *Attorney, Agent, or Firm* — Kacvinsky Daisak Bluni PLLC

(57) ABSTRACT

Various embodiments are directed to restrictions in portable computing device electric power to accommodate reductions in the voltage level of a power source. An apparatus comprises a controller caused to receive configuration data from a main processor circuit specifying a voltage level threshold and selected action to take to reduce electric power to a first component in response to the voltage level falling below the first voltage level threshold, recurringly monitor the voltage level; based on the voltage level falling below the first voltage level threshold, take the first selected action and transmit a signal to the main processor circuit indicating that the voltage level has fallen below the first voltage level threshold and that the first selected action has been taken; transmit the voltage level to the main processor circuit; receive a signal from the main processor circuit to undo the first selected action; and so undo.

28 Claims, 10 Drawing Sheets

2500

STAGED POWER DISTRIBUTION CONTROL

BACKGROUND

Portable computing devices are increasingly subject to the two opposing requirements of greater portability through smaller size and weight, and greater utility through more and greater capabilities. In response, manufacturers of portable computing devices continue to employ ever newer battery technologies and continuing improvements thereto in an effort to provide ever greater amounts of electric power in an ever smaller physical configuration for these portable computing devices.

However, despite great strides in battery technology, even the best of current day batteries have limits, and not just in capacity. For example, despite the relatively high charge densities of current lithium-ion and lithium-polymer batteries, there are limits on the rate of current output of such current day batteries that result from internal resistances, temperature increases, and battery health more generally. This becomes significant as more power-consumptive features such as amplified audio output, long-range radio frequency wireless communications, and flash lighting for the taking of pictures become increasingly commonplace in portable computing devices.

Such limitations on battery current output combined with the use of such power-consumptive features can result in dips in the voltage level of the electric power output of such batteries that can lead to unstable operation of portable computing devices. This can become particularly acute as such batteries become depleted such that they can no longer sustain supplying electric power at any relatively high current level without the voltage level of their outputs dropping to levels that may violate minimum system operating requirements. This can also become particularly acute for even a fully charged battery when multiple ones of such power consumptive features are used simultaneously.

Typical portable computing devices attempt to continue to support high rates of current output of such batteries, even as they become progressively more depleted, through the use of boost power converters and/or high density capacitors to absorb short periods of particularly high power consumption. Unfortunately, such measures are often insufficient as more and more of such power-consumptive features are increasingly incorporated into portable computing devices, especially where those power-consumptive features make use of higher amounts of electric current for periods of time that are longer than can be accommodated through the use of such measures.

DETAILED DESCRIPTION

Figure 1:
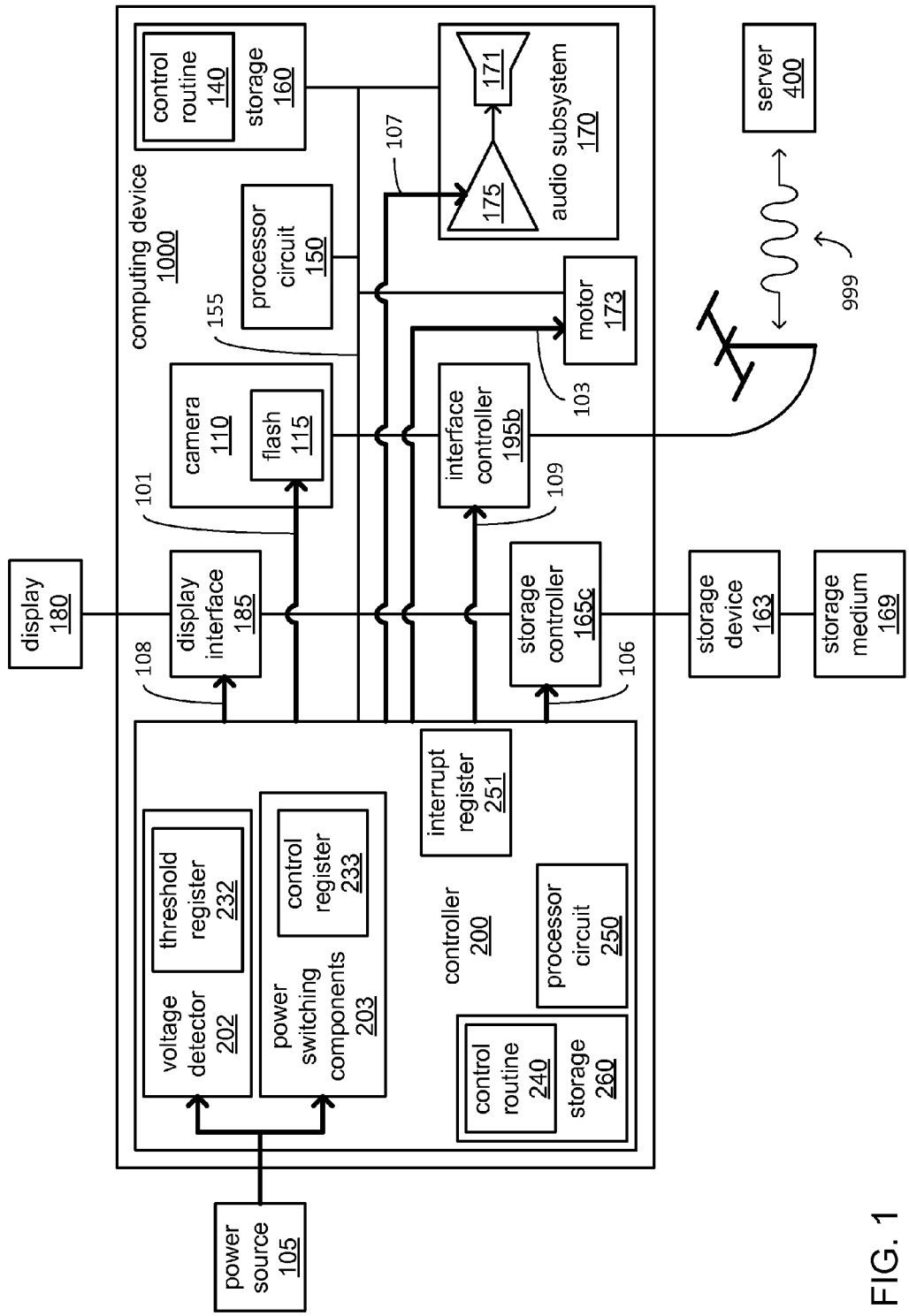
FIG. 1 illustrates a first embodiment of a computing device.

Various embodiments are generally directed to restrictions in the provision of electric power to components in a portable computing device to proactively mitigate reductions in the voltage level of a battery providing its electric power over time. To minimize the overall reduction in voltage levels of the electric power provided to other components, one or more relatively highly power-consumptive features of that portable computing device may be subjected to restrictions in the provision of electric power that restrict their functionality to a limited degree that is relatively unlikely to have a noticeable effect on a user's experience or operation of those features. In usage scenarios that lead to a greater reduction in a voltage level of electric power provided to other components, one or more of such features may be subjected to greater restrictions that entail disabling one or more aspects of those features while still allowing those features to remain enabled for use. To accommodate a still greater reduction in that voltage level, still greater restrictions may be imposed that entail entirely disabling one or more of those features, possibly accompanied by the presentation of a notice advising a user of the limited availability of remaining electric power from that battery. Thus, restrictions in power levels are imposed in a staged manner.

Such a portable computing device may incorporate a controller that monitors the voltage level of the electric power provided by a battery, and may respond to reductions in that voltage level in a manner determined by configuration of the controller by a processor circuit of that portable computing device. Such configuration may entail the setting of one or more voltage level thresholds and/or selected actions to be taken by the controller independently of that processor circuit in response to the voltage level falling below one or more of those voltage level thresholds. Among the actions taken may be signaling the processor circuit via an interrupt or other signal to inform the processor circuit of the falling voltage level and/or that a selected action in response to that reduction in voltage below a voltage level threshold has been taken.

In some embodiments, the controller may also be configured to take selected actions in response to signals received from one or more components of the portable computing device that implement one or more of such highly power-consumptive features. Such signals may indicate current consumption of relatively high amounts of electric current by those components and/or may provide a proactive indication of imminent consumption of relatively high amounts of electric current by those components. In some embodiments, the controller may also be configured to signal one or more of such components to reduce the amount of electric current they consume or are imminently about to consume (as signaled to the controller) in implementing highly power-consumptive features to one or more selected degrees.

In one embodiment, for example, an apparatus comprises a controller comprising logic causing the controller to receive configuration data from a main processor circuit, the configuration data specifying a first voltage level threshold and a first selected action for the controller to take to reduce electric power provided to a first component providing a first feature in response to the voltage level of a power source providing electric power to the controller and first component falling below the first voltage level threshold; recurringly monitor the voltage level of the power source; based on the voltage level of the power source falling below the first voltage level threshold, take the first selected action and transmit a signal to the main processor circuit that indicates that the voltage level of the power source has fallen below the first voltage level threshold and that the first selected action has been taken; transmit an indication of the voltage level of the power source to the main processor circuit; receive a signal from the main processor circuit to undo the first selected action; and act to undo the first selected action.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may comprise a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of a computing device 1000 optionally coupled to a server 400. The computing device 1000 may be any of a variety of types of computing device, including without limitation, a desktop computer system, a data entry terminal, a laptop computer, a netbook computer, an ultrabook computer, a tablet computer, a handheld personal data assistant, a smartphone, a body-worn computing device incorporated into clothing, a computing device integrated into a vehicle (e.g., a car, a bicycle, a wheelchair, etc.), a server, a cluster of servers, a server farm, etc. As depicted, the computing devices 400 and 1000 exchange signals conveying any of a variety of types of data via a network 999. In various embodiments, the network 999 may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission. However, as depicted, the network 999 is a wireless network.

In various embodiments, the computing device 1000 comprises one or more of a processor circuit 150 (in the role of a main processor circuit of the computing device 1000), a storage 160 storing a control routine 140, a power source 105, a camera 110, a storage controller 165c, an audio subsystem 170, a vibration motor 173, a display interface 185, and an interface controller 195b. As depicted, the camera 110 comprises a flash 115, and the audio subsystem 170 comprises an acoustic driver 171 and an audio amplifier 175. As depicted, the storage controller 165c and the display interface 185 are coupled to a storage device 163 providing access to the contents of a storage medium 169, and to a display 180, respectively. The computing device 1000 may additionally comprise one or more of the storage device 163 and the display 180. The vibration motor 173 is made up of a rotary, linear or voice coil motor that acts to move a weight to vibrate the computing device 1000 to provide a signal to an operator of the computing device 1000 of an incoming call or to provide haptic feedback (e.g., through fingertips) in their operation of various controls (not shown) of the computing device 1000. The interface controller 195b couples the computing device 1000 to the network 999, and therethrough to one or more other computing devices such as the server 400.

The computing device 1000 also comprises a controller 200. The controller 200 comprises one or more of a processor circuit 250 (in the role of a controller processor circuit), a storage 260 storing a control routine 240, a voltage detector 202, power switching components 203, and an interrupt register 251. As depicted, the voltage detector comprises a threshold register 232 and the power switching components 203 comprise a control register 233.

The controller 200, with the processor circuit 250 executing at least the control routine 240 in its role as the controller processor circuit defines an operating environment of the controller 200 that may be intentionally isolated from a main operating environment defined within much of the rest of the computing device 1000 by at least the processor circuit 150 executing the control routine 140 in its role as the main processor circuit. More specifically, the processor circuit 150 may be provided with limited or no access to the storage 260 and/or other components of the controller 200, thereby preventing unauthorized access to at least the control routine 240 (either as stored in the storage 260 or as executed by the processor circuit 250) by the processor 150. In contrast, the processor circuit 250 may have far greater access to hardware and/or software components of the rest of the computing device 1000 beyond the controller 200. As will be explained in greater detail, this enables the operating environment of the controller 200 to be employed in independently recurringly checking and providing information on the state of the electric power provided by the power source 105 to the rest of the computing device 1000, and to take one or more selected actions to accommodate a voltage level at which that electric power is so provided.

It should be noted that although the controller 200 is depicted and discussed herein as incorporating a processor circuit executing a control routine to cause the controller 200 to perform the various functions described herein, this is but one example of the manner in which the controller 200 may implement logic. Other embodiments are possible in which the controller 200 implements logic substantially or entirely in hardware-based digital logic in which no instructions of any form of routine are executed. In such implementations, one or more discrete logic components and/or programmable logic devices may be used. Stated differently, the controller 200 implements logic in any of a variety of ways that causes the controller to perform the various functions described herein.

As also depicted, the computing device 1000 further comprises a coupling 155 that couples one or both of the processor circuit 150 and the controller 200 to one or more of the storage 160, the camera 110, the storage controller 165c, the audio subsystem 170, the vibration motor 173, the display interface 185, and the interface controller 195b. The coupling 155 is comprised of one or more buses, point-to-point interconnects, transceivers, buffers, crosspoint switches, and/or other electrical/optical conductors and/or logic. With the processor circuit 150 and the controller 200 being so coupled by the coupling 155, each is able to perform the various ones of the tasks to be described herein.

As further depicted, the power source 105 is coupled to the controller 200, and in turn, the controller 200 is further coupled to one or more of the camera 110, the vibration motor 173, the storage controller 165c, the audio subsystem 170, the display interface 185, and the interface controller 195b via one or more power conductors 101, 103, 106, 107, 108 and 109, respectively. Through these power conductors, the controller 200 may selectively provide or cease to provide electric power to each of the flash 115 of the camera 110, the vibration motor 173, storage controller 165c, the audio amplifier 175 of the audio subsystem 170, the display interface 185, and the interface controller 195b, as will be explained. Such selective provision or cessation of provision of electric power is carried out through operation of one or more of the power switching components 203, as will be explained.

In some embodiments, the computing device 1000 may be at least partially implemented as a SOC (system on-a-chip) in which at least some of the processor 150, the storage 160, the camera 110, the storage controller 165c, the audio subsystem 170, the display interface 185, the interface controller 195b and the controller 200 may be combined within a single IC (integrated circuit). In such embodiments, one or more of the power conductors 101 and 106-109 may be formed as conductive traces traversing portions of a single common silicon die on which at least some of the components 110, 165c, 170, 185 and 195b are disposed. Alternatively, portions of one or more of these components may be spread across more than one silicon die incorporated into a MCM (multi-chip module), in which case a subset of the power conductors 101 and 106-109 may extend between the separate silicon die within a MCM package at least partially as gold wires or other forms of electrical/optical conductors. As yet another alternative, these components may be spread across more than one silicon die disposed within separate chip packages (pin grid array, ball grid array, land grid array, dual in-line package, etc.), in which case a subset of these power conductors may extend between die at least partially as traces formed on one or more circuitboards on which each of those chip packages are disposed.

In executing at least the control routine 140, the processor circuit 150 is caused to either directly access the threshold register 232 and/or the control register 233 within the controller 200, or to otherwise signal the controller 200, to set one or more voltage level thresholds and/or debounce delays, and to specify one or more selected actions to be taken by the controller 200 in response to the voltage level of the electric power provided by the power source 105 either falling below or rising above those one or more of those voltage level thresholds. It should be noted that although the threshold register 232 and the control register 233 are depicted and discussed herein as being distinct registers incorporated separately into the voltage detector 202 and the power switching components 203, other implementations of these registers are possible in which they are implemented as a single combined register, one or both are implemented as multiple registers, one or both are implemented as storage locations within the storage 260 (e.g., implemented as virtual registers), etc.

The processor circuit 150 is then caused by the control routine 140 to await receipt of an indication from the controller 200 that the voltage level of the electric power provided by the power source 105 has fallen below and/or risen above one or more of such voltage level thresholds and/or that one or more of such selected actions have been taken by the controller 200 in response to such falling below or rising above one or more voltage level thresholds. Such a signal may be received by the processor circuit 150 as an interrupt signal conveyed to the processor circuit 150 via a distinct interrupt signal conductor (e.g., a so-called "hardware interrupt"), as an interrupt message conveyed to the processor circuit 150 via the coupling 155 (e.g., a so-called "interrupt message"), or in any of a variety of other possible mechanisms of communication with the processor circuit 150. Upon receipt of such a signal, the processor circuit 150 may be caused to access the interrupt register 251 (which again, may be implemented in any of a number of ways) to obtain an indication of the voltage level threshold beneath which or above which a voltage level of the electric power provided by the power source 105 may have fallen or risen, to obtain an indication of a current voltage level, to obtain an indication of the action taken by the controller, and/or to respond to an action taken by the controller 200 (possibly, to undo that action).

In executing at least the control routine 240, the processor circuit 250 is caused to recurringly access the voltage detector 202 to monitor the voltage level of the electric power provided by the power source 105 for an indication of that voltage level falling below or rising above one or more voltage threshold levels earlier set by the processor circuit 150, as described. Upon the occurrence of the voltage level of the electric output of the power source 105 falling below such a voltage level threshold, the processor circuit 250 is caused to access the control register 233 to obtain an indication of what action has been specified by the processor circuit 150 to be taken in response. The processor circuit 250 is then caused to carry out that action, which may include operating one or more of the power switching components 203 to impose a restriction on the amount of electric power provided by the power source 105 to one or more components of the computing device 1000. Such restrictions may include ceasing to provide power to one or more of the flash 115, the vibration motor 173, the storage device 163 (through the storage controller 165c), the audio amplifier 175, the display 180 (through the display interface 185), a wireless transceiver component of the interface controller 195b, etc., or possibly providing reduced power, as will be explained in greater detail. Alternatively or additionally, such action may include signaling the processor circuit 150 (e.g., via an interrupt signal, message conveyed via the coupling 155, etc.) that the voltage level of the electric power provided by the power source 105 has fallen below that voltage threshold level. Alternatively or additionally, such action may include recurringly updating the interrupt register 251 with an indication of the current voltage level of the electric power provided by the power source 105 and/or awaiting an indication from the processor circuit 150 to undo an action taken in response to that voltage level having fallen below a voltage level threshold.

In some embodiments, the power source 105 may be of a type that stores a limited amount of electric power, e.g., a battery, fuel cell, supercapacitor, etc., as in embodiments in which the computing device 1000 is some form of portable computing device. In embodiments in which the power source 105 comprises a battery, any of a variety of technologies and/or materials may be employed in storing electric power, including without limitation, nickel metal hydride, lithium-ion, lithium polymer, etc.

In various embodiments, each of the processor circuits 150 and 250 may comprise any of a wide variety of commercially available processors, including without limitation, an AMD® Athlon®, Duron® or Opteron® processor; an ARM® application, embedded or secure processor; an IBM® and/or Motorola® DragonBall® or PowerPC® processor; an IBM and/or Sony® Cell processor; or an Intel® Celeron®, Core (2) Duo®, Core (2) Quad®, Core i3®, Core i5®, Core i7®, Atom®, Itanium®, Pentium®, Xeon® or XScale® processor. Further, one or more of these processor circuits may comprise a multi-core processor (whether the multiple cores coexist on the same or separate dies), and/or a multi-processor architecture of some other variety by which multiple physically separate processors are in some way linked. Alternatively or additionally, one or both of the processors 150 and 250 may be a state machine, possibly implemented with gate logic programmed into a field-programmable gate array (FPGA) or other logic device(s), whether programmable or otherwise.

In various embodiments, each of the storages 160 and 260, as well as the combination of the storage device 163 and the storage medium 169, may be based on any of a wide variety of information storage technologies, possibly including volatile technologies requiring the uninterrupted provision of electric power, and possibly including technologies entailing the use of machine-readable storage media that may or may not be removable. Thus, each of these storages may comprise any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may comprise multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

It should be noted that although parameters such as voltage level thresholds and/or debounce times are discussed as stored in the storage 160 as the configuration data 132, it is possible in other embodiments that such parameters are provided to one or both of the processor circuits 150 and 250 via any of a variety of forms of hardware strapping. More specifically, either at the time of manufacture or assembly of components of the computing device 1000, various fuses may be blown within one or more of the components that set voltage level thresholds and/or debounce times. Alternatively or additionally, strapping of pins of component packages with pull-up or pull-down resistors may be used. Still other hardware strapping mechanisms are possible as those skilled in the art will readily recognize.

In various embodiments, the interface controller 195*b* may employ any of a wide variety of signaling technologies enabling the computing device 1000 to be coupled to other devices as has been described. Each of these interfaces comprises circuitry providing at least some of the requisite functionality to enable such coupling. However, this interface may also be at least partially implemented with sequences of instructions executed by the processor circuits 150 and/or 250 (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

In various embodiments, the display 180 (accessible via the display interface 185) may be based on any of a variety of display technologies, including without limitation, a liquid crystal display (LCD), including touch-sensitive, color, and thin-film transistor (TFT) LCD; a plasma display; a light emitting diode (LED) display; an organic light emitting diode (OLED) display; a cathode ray tube (CRT) display, etc. Each of these displays may be disposed on a casing of corresponding ones of the computing device 1000, or may be disposed on a separate casing of a physically separate component of the computing device 1000 (e.g., a flat panel monitor coupled to other components via cabling).

Figure 2:
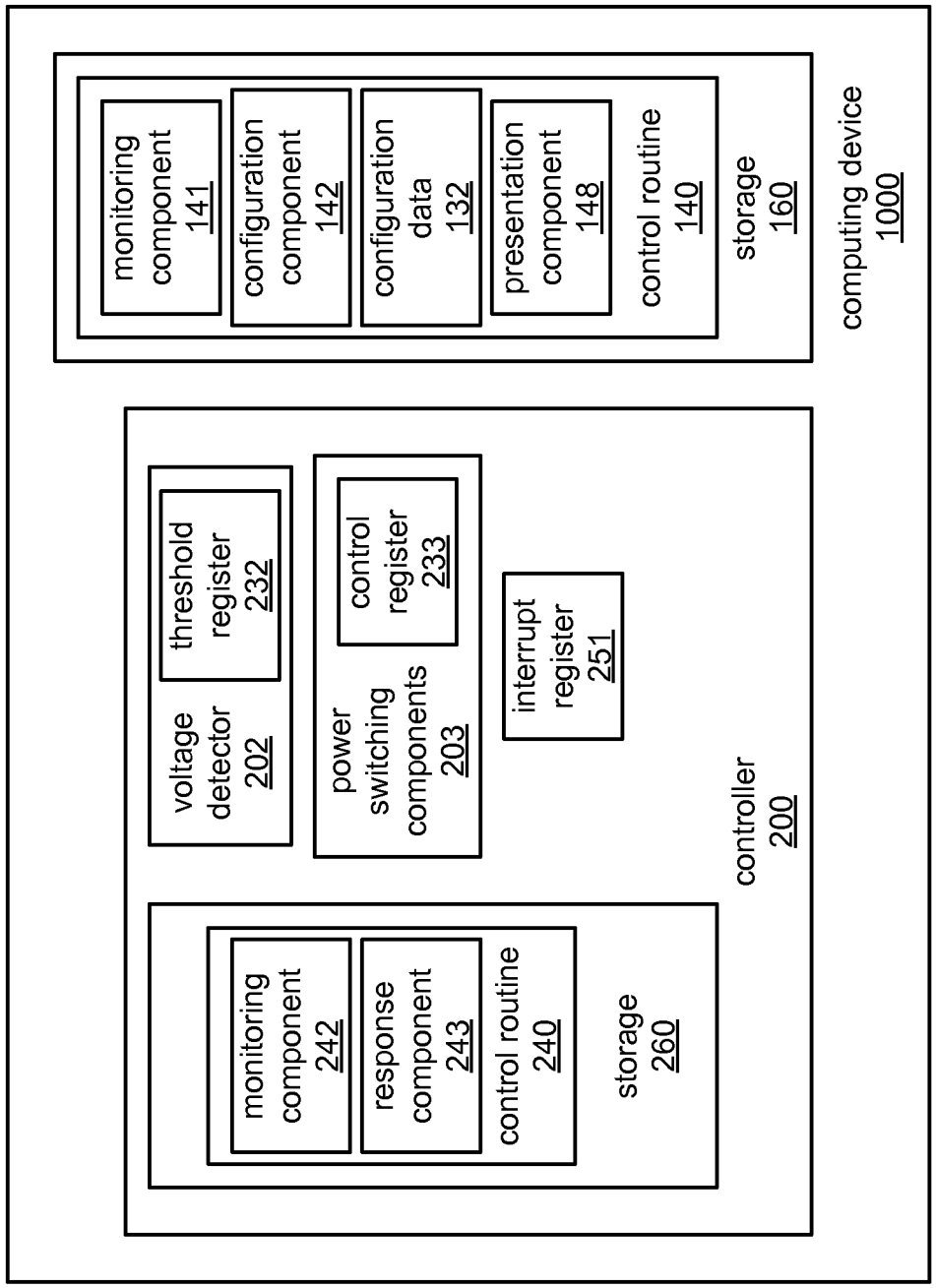
FIG. 2 illustrates a portion of the embodiment of FIG. 1, depicting various possible details of implementation.

FIG. 2 illustrates portions of the computing device 1000 of FIG. 1 in greater detail. More specifically, aspects of the operating environments of the processor circuits 150 and 250 executing respective ones of the control routine 140 and 240 to perform the aforedescribed functions are depicted. As will be recognized by those skilled in the art, each of the control routines 140 and 240, including the components of which each is composed, implement logic as a sequence of instructions and are selected to be operative on (e.g., executable by) whatever type of processor or processors that are selected to implement each of the processor circuits 150 and 250, respectively. Further, it is important to note that despite the depiction in this figure of a specific allocation of implementation of logic between hardware and software components and routines made up of instructions, different allocations are possible in other embodiments.

In various embodiments, one or both of the control routines 140 and 240 may comprise a combination of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor circuits 150 and 250, including without limitation, Windows™, OS X™ Linux®, iOS, Android OS™, RTOS, Symbian™ or Blackberry® OS. Where one or more device drivers are included, those device drivers may provide support for any of a variety of other components, whether hardware or software components, that comprise one or more of the computing device 1000 and the controller 200.

The control routine 140 may comprise a configuration component 142 executable by the processor circuit 150 to access the threshold register 232 (or to otherwise signal the controller 200) to set at least first and second voltage level thresholds, and/or to set at least one debounce period. The first voltage level threshold is set higher than the second to define at least three ranges of voltage levels against which the voltage level of the electrical power provided by the power source 105 is to be recurringly compared by the controller 200. The processor circuit 150 may be caused to access a configuration data 132 stored in the storage 160, the configuration data 132 specifying these voltage level thresholds and/or debounce period(s). It may be that these voltage level thresholds and/or debounce periods are selected by the manufacturer of the computing device 1000 and/or an individual or other organization involved in preparing the computing device 1000 for use. These voltage level thresholds and/or debounce periods are envisioned as being selected in a manner taking into account factors such as what highly power-consumptive features are supported by the computing device 1000 and/or electric power storage characteristics of the power source 105.

Above the first voltage level threshold is a first range of voltage levels within which a presumption is made that all electric power necessary to support the various highly power-consumptive features of the computing device 1000 is available such that little or no restrictions need be imposed on their use. Between the first and second voltage level thresholds is a second range of voltages levels within which a presumption is made that electric power necessary to support highly power-consumptive features with some restrictions is still available, the restrictions affecting various aspects of the use of at some of those features, but not entailing disabling any of those features. It is envisioned that the restrictions imposed in response to voltages between the first and second voltage levels are selected to be relatively unnoticeable to an operator of the computing device 1000, such that their user experience is minimally affected. Below the second voltage level threshold is a third range of voltages levels within which a presumption is made that electric power necessary to support highly power-consumptive features with greater restrictions is still available, the restrictions entailing disabling at least some of those features, possibly disabling different ones at different times such that there may be some features that are not permitted to be used at the same time as some others. It is envisioned that these greater restrictions will have a more noticeable effect on the user experience of operating the computing device 1000. There may additionally be a fourth voltage level threshold beneath which a presumption is made that inadequate electric power is available to support continued operation of the computing device 1000 such that instability and/or other negative effects are imminent.

The processor circuit 150 may be further caused by the configuration component 142 to access the control register 233 (or to otherwise signal the controller 200) to set selected actions to be taken by the controller 200 to accommodate instances of the voltage level of the electric power provided by the power source 105 falling below at least one of the first or second voltage level thresholds. The processor circuit 150 may again be caused to access the configuration data 132, the configuration data 132 specifying these selected actions. These selected actions may be selected by the manufacturer of the computing device 1000 and/or by an individual or other organization involved in preparing the computing device 1000 for use. As with the voltage level thresholds and/or debounce periods, these selected actions are envisioned as being selected in a manner taking into account factors such as what highly power-consumptive features are supported by the computing device 1000 and/or electric power storage characteristics of the power source 105.

It is envisioned that the processor circuit 150 is likely to be sufficiently engaged in performing various tasks desired by a user of the computing device 1000 that it may not be able to respond sufficiently quickly to the voltage level of the electric power provided by the power source 105 falling below one or more of the voltage threshold levels to avoid undesired consequences such as instability in the operation of the computing device 1000. An event, such as the substantially simultaneous use of more than one of multiple highly power-consumptive features may cause the voltage level of the electric power provided by the power source 105 to swiftly fall to a level low enough to imminently cause operation of the computing device 1000 to become unstable. There may be insufficient time for the processor circuit 150 to be signaled, to access the interrupt register 251 or to obtain information concerning the low voltage level by another mechanism, to access the storage 160 to retrieve the configuration data 132, to determine what action to take, and to take that action. In contrast, the technology, components and/or other aspects of the controller 200 are chosen to be able to react to such an event sufficiently quickly as to prevent the onset of unstable operation. Further, the controller 200 is provided with an explicit indication of what action to take by the processor circuit 150 (via the control register 233 or whatever other mechanism). It is for these reason that it is deemed desirable to configure the controller 200, with its direct involvement in the distribution of electric power to components, to respond to at least some (if not all) of such events independently of the processor circuit 150.

In some embodiments, it may be deemed desirable for the controller 200 to undertake more extensive action independently of the processor circuit 150 only in response to a falling voltage level that falls to a greater degree, but to do little more than to inform the processor circuit 150 in response to a falling voltage level that falls only to a lesser degree, thereby enabling the processor circuit 150 to act. Thus, in such embodiments, the processor circuit 150 is caused by the configuration component 142 to configure the controller 200 to act only to signal the processor circuit 150 in response to the voltage level of the electric power provided by the power source 105 falling below only a higher voltage level threshold (e.g., the aforementioned first voltage level threshold) to enable the processor circuit 150 to take further action, but to also configure the controller 200 to act independently of the processor circuit 150 to disable one or more highly power-consumptive features of the computing device 1000 in response to that voltage level falling below a lower voltage level threshold where instability of operation is deemed more likely (e.g., the aforementioned second voltage level threshold).

In other embodiments, it may be deemed desirable for the controller 200 to undertake all actions in response to falling voltage levels independently of the processor circuit 150. Thus, in such embodiments, it may be that the processor circuit 150 is caused by the configuration component 142 to configure the controller 200 to act to independently to impose somewhat limited restrictions on aspects of one or more highly power-consumptive features in response to the voltage level of the electric power provided by the power source 105 falling below only a higher voltage level threshold (e.g., the aforementioned first voltage level threshold), and to configure the controller 200 to act to independently impose more stringent restrictions on aspects of those highly power-consumptive features (e.g., possibly disabling one or more of those features, entirely) in response to that voltage level falling below a lower voltage level threshold (e.g., the aforementioned second voltage level threshold).

By way of example, and referring back to the earlier example of first and second voltage level thresholds defining first, second and third ranges of voltages, the controller 200 may be configured by the processor circuit 150 to respond to the voltage level of the electric power provided by the power source 105 falling below the first voltage level threshold either by simply signaling the processor circuit 150 with an interrupt or other signal conveying the fact of this reduction in voltage level to the processor circuit 150, or by independently acting to reduce the provision of electric power via the power conductors 108 to the display interface 185 to cause a reduction in backlighting in the display 180 (resulting in the display 180 becoming dimmer, but remaining viewable). Alternatively or additionally, power provided via the power conductors 101, 103 and/or 107 to the flash 115, the vibration motor 173, and/or the audio amplifier 175 may be reduced to diminish the amount of lighting generated by the flash 115 when the camera 110 is used to take a picture (resulting in somewhat darker pictures), to cease providing haptic feedback in the operation of controls of the computing device 1000, and/or the amount of amplification provided by the audio amplifier 175 when the acoustic driver 171 is used to output sounds (resulting in somewhat lower audio volume). Further, the controller 200 may be configured to respond to the voltage level of the electric power provided by the power source 105 falling below the second voltage level threshold by entirely ceasing provision of electric power for one or more of backlighting provided by the display 180 (possibly rendering the display 180 unreadable), flash lighting provided by the flash 115 (possibly causing the images captured by the camera 110 to be very dark), ceasing provision of electric power for the vibration motor 173 for either haptic or ring indication use, and audio amplification provided by the audio amplifier 175 (possibly causing no sounds to be output by the acoustic driver 171). Still further, such independent action in response to the falling of the voltage level below either or both of the first and second voltage level thresholds may be accompanied by the controller 200 also signaling the processor circuit 150 about such reductions in the voltage level having been detected via the voltage detector 202.

The processor circuit 150 may be still further caused by the configuration component 142 to access the control register 233 (or to otherwise signal the controller 200) to configure one or more of the actions taken independently by the controller 200 to have a "latching" or "sticky" characteristic, by which the controller 200 responds to the falling of the voltage level of the electric power provided by the power source 105 below a threshold by taking a selected action, but not subsequently acting independently to undo or end that selected action in response to that voltage level subsequently rising above that same voltage threshold and/or remaining above that voltage threshold for the duration of a selected debounce period. Instead, the controller 200 may signal the processor circuit 150 of the rise of that voltage level above that threshold (possibly after waiting for the duration of a debounce period) and await action by the processor circuit 150 to intervene to undo that selected action to cease. As a result, while the imposition of the selected action may occur relatively quickly at the behest of the controller 200, some degree of delay made up of at least an amount of time required for the processor circuit 150 to respond, as well as possibly also a debounce period before the processor circuit 150 is signaled, may be imposed on action taken to end the selected action. This may be deemed desirable to avoid instances of a cycling between the imposition and cessation of the selected action in an oscillatory manner as a result of the voltage level of the electric power provided by the power source 105 rising above and falling below a voltage level threshold as a result of taking and undoing the selected action. Further, the imposition of a debounce period aids in avoiding instances in which the processor circuit 150 is signaled with a false indication of that voltage level rising above that voltage level threshold as a result of a spike or other unsteadiness in the voltage level arising from a situation other than a component ceasing or reducing its consumption of electric power to implement a highly power consumptive feature.

The control routine 140 may comprise a monitoring component 141 executable by the processor circuit 150 to await receipt of an interrupt or other signal from the controller 200 to the effect that the voltage level of the electric power provided by the power source 105 has fallen below and/or risen above a threshold, and/or a selected action has been taken by the controller 200 in response to a reduction and/or rise in voltage level. As has just been discussed, at length, what events result in the controller 200 signaling the processor 150 (either via an interrupt or in some other manner) is configurable by the processor circuit 150 in executing the configuration component 142. Upon receiving the signal from the controller 200, the processor circuit 150 may be caused by the monitoring component 141 access the interrupt register 251 to obtain information concerning the event that caused the processor circuit 150 to be signaled by the controller 200. By way of example, the interrupt register 251 may comprise one or more bits that each correspond to an event (e.g., an instance of a voltage level falling below a specific voltage level threshold, a voltage level rising above a specific voltage level threshold, a specific action taken by the controller 200 to reduce or cease provision of electric power for a specific feature, etc.), and/or may comprise one or more bits specifying a current voltage level of the electric power provided by the power source 105. The processor circuit 150 may use such information to determine whether to take action to further reduce power consumption, whether to alter an aspect of the manner in which the controller 200 has been configured, whether to act to undo a selected action taken by the controller 200, whether to present an indication (audibly and/or visibly) to a user of the computing device 1000 that one or more features have been disabled due to limited availability of electric power, etc.

The control routine 140 may comprise a presentation component 148 executable by the processor circuit 150 to present an indication to a user of the computing device 1000 warning of limited availability of electric power from the power source 105 and/or advising of the disabling of one or more highly power-consumptive features in response to such limited availability of electric power. The processor circuit 150 may be caused to present this indication visually on the display 180 and/or audibly via the acoustic driver 171 (the choice possibly dependent on whether one or the other has been disabled in some manner by the controller 200 to conserve electric power). Alternatively, the processor circuit 150 may be caused to present this indication in a much simpler manner, such as causing a light-emitting diode (LED) to flash, the LED possibly labeled in print on a casing of the computing device 1000 as indicating a low power condition when flashing.

The control routine 240 may comprise a monitoring component 242 executable by the processor circuit 250 to recurringly monitor the voltage detector 202 to detect instances where the voltage level of the electric power provided by the power source 105 falls below or rises above one or more voltage level thresholds set by the processor circuit 150 via the threshold register 232 (or other mechanism for setting such thresholds). In some embodiments, the processor circuit 250 may also be caused by the control routine 240 to recurringly update one or more bits of the interrupt register 251 to provide the processor circuit 150 with an indication of a current voltage level of the electric power provided by the power source 105.

The control routine 240 may comprise a response component 243 executable by the processor circuit 250 to respond to instances of the voltage level of the electric power provided by the power source 105 falling below a voltage level threshold by taking one or more selected actions specified by the processor circuit 150 via the control register 233 (or other mechanism for specifying the one or more selected actions to take). As previously discussed, among those selected actions may include signaling the processor circuit 150 to the effect that such a reduction in the voltage level of the electric power provided by the power source 105 has occurred. Alternatively or additionally, and as also previously discussed, those selected actions may include reducing and/or ceasing provision of electric power to one or more components of the computing device 100 (e.g., one or more of the components 110, 173, 165c, 170, 185 and 195b) that provide relatively highly power-consumptive features of the computing device 1000. The processor circuit 250 may do so by operating one or more of the power switching components 203 to reduce and/or cease the provision of electric power via one or more of the power conductors 101, 103 and 106-109. It should be noted that whether electric power provided via one or more of the power conductors 101, 103 and 106-109 may be reduced and/or can only be ceased may be dependent upon characteristics of the components thereby provided with electric power and/or how that electric power is used. By way of example, digital circuit of components supplied with electric power via one or more of these power conductors may not be amenable to a reduction in the electric power, and may begin to function unstably. However, the flash 115 of the camera 110, the audio amplifier 175 of the audio subsystem 170, and/or a backlight of the display 180 may be more amenable to such a reduction in electric power such that they simply provide reduced amplification and/or emit a dimmer level of light.

Figure 3:
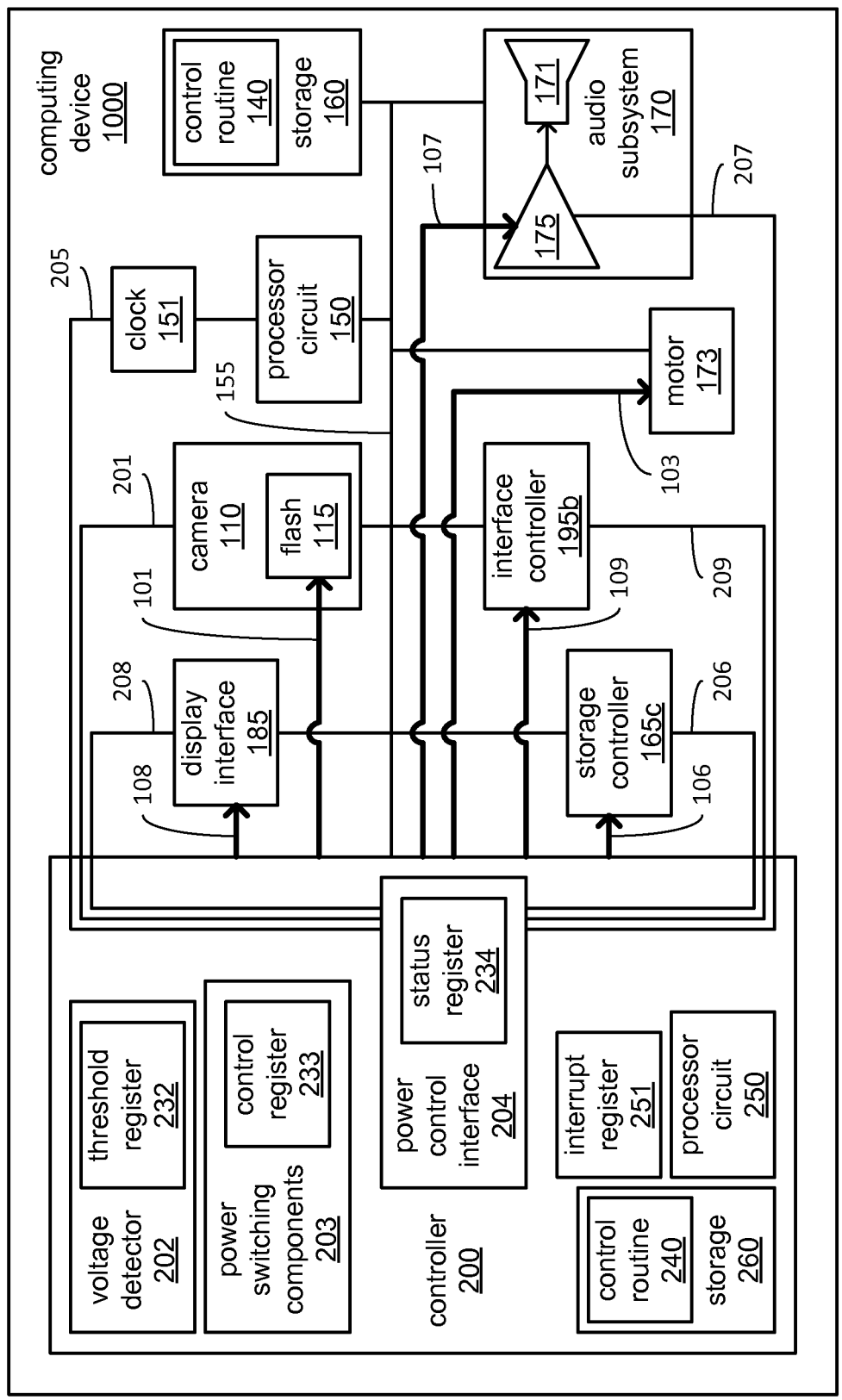
FIG. 3 illustrates a second embodiment of a computing device.

FIG. 3 illustrates a block diagram of a variation of the computing device 1000 as presented in FIG. 1. For sake of clarity of depiction and discussion, depictions of the power source 105, the storage device 163, the storage medium 169, the display 180, the server 400 and the network 999 (which were depicted in FIG. 1) have been omitted in FIG. 3. This variation depicted in FIG. 3 is similar to what is depicted in FIG. 1 in many ways, and thus, like reference numerals are used to refer to like elements throughout. However, unlike the variant of the computing device 1000 of FIG. 1, the variant of the computing device 1000 of FIG. 3 further comprises a clock 151 coupled to the processor circuit 150, and the controller 200 of this variant further comprises a power control interface 204 that itself comprises a status register 234. Further, this variant of the computing device 1000 additionally comprises signal conductors 201 and 205-209 that couple the power control interface 204 to each of the camera 110, the clock 151, the storage controller 165c, the audio subsystem 170, the display interface 185 and the interface controller 195b. Thus, through the power control interface 204, the controller 200 is able to exchange signals with each of these devices in a manner that may not involve use of the coupling 155. It may be that each of the signal conductors 201 and 205-209 conduct a relatively simple signal representing one or more commands and/or status indications. Alternatively, it may be that one or more of the signal conductors 201 and 205-209 comprise one or more buses, e.g., either a single common bus comprising conductors that extend to all of these devices, or separate point-to-point buses that each comprise one or more conductors that extend separately from the power control interface 204 to each of these components 110, 151, 165c, 170, 185 and 195b.

In this variation of the computing device 1000, one or more of the signal conductors 201 and 205-209 may convey signals indicating a current status of the consumption of electric power by one or more of the camera 110, the clock 151, the storage controller 165c, the audio subsystem 170, the display interface 185 and the interface controller 195b. Thus, the controller 200 may be provided with indications of which of the highly power-consumptive features supported by each of these components is currently in use (and thus, which is currently consuming electric power) at any given time. Alternatively or additionally, one or more of the signal conductors 201 and 205-209 may convey signals indicating upcoming imminent consumption of electric power by one or more of the camera 110, the clock 151, the storage controller 165c, the audio subsystem 170, the display interface 185 and the interface controller 195b. Thus, the controller 200 may be provided with indications of which of the highly power-consumptive features supported by each of these components is imminently about to consume electric power.

Alternatively or additionally, in this variation of the computing device 1000, one or more of the signal conductors 201 and 205-209 may convey signals indicating a command to one or more of the camera 110, the clock 151, the storage controller 165c, the audio subsystem 170, the display interface 185 and the interface controller 195b to reduce their consumption of electric power. Thus, the controller 200 may be provided with a mechanism to reduce the consumption of power other than to control the provision of electric power to these components. By way of example, the controller 200 may employ the signal conductor 201 to signal the camera 110 to reduce the amount of electric power used in operating the flash 115, employ the signal conductor 106 to signal the storage controller 165c to reduce or cease provision of electric power to the storage device 163, and/or employ the signal conductor 105 to signal the clock 151 to reduce the clock rate at which the processor circuit 150 operates. In this way, reductions in power consumed by one or more of such components may be affected without altering the voltage level and/or other characteristics of the electric power provided to those components, which may not be possible with some components.

To accommodate the ability to receive status indications from highly power-consumptive components, the control register 233 in the variant of the computing device 1000 of FIG. 3 may additionally include bits enabling the processor circuit 150 to specify what selected actions that the controller 200 is to take in response to receiving one or more of such status indications. Correspondingly, to accommodate the ability to signal highly power-consumptive components to change their degree of power consumption, the control register 233 in the variant of the computing device 1000 of FIG. 3 may additionally include bits enabling the processor circuit 150 to specify such signaling of components as among the possible selected actions that the controller 200 may take.

Figure 4:
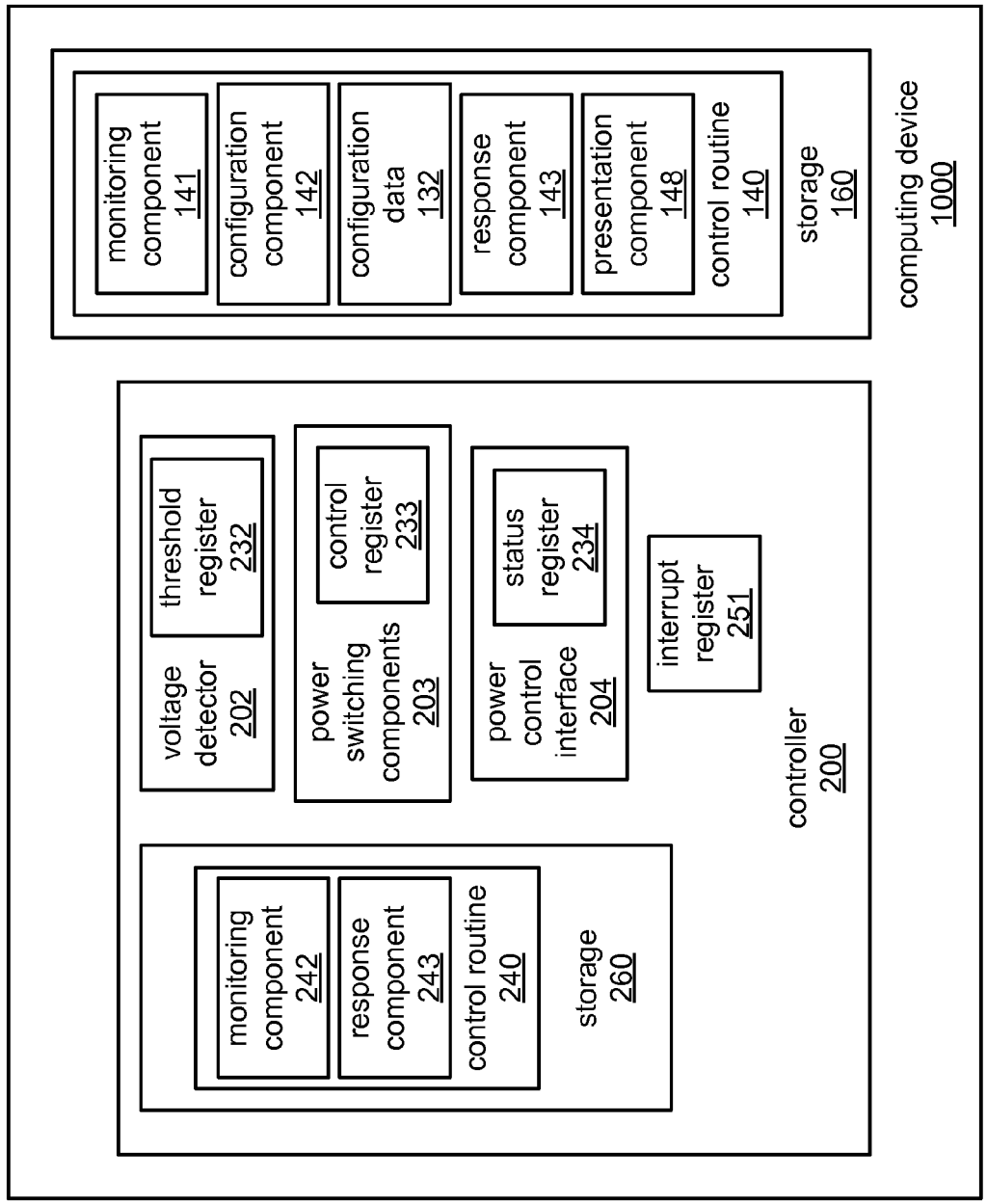
FIG. 4 illustrates a portion of the embodiment of FIG. 3, depicting various possible details of implementation.

FIG. 4 illustrates portions of the variation of the computing device 1000 of FIG. 3 in greater detail. More specifically, aspects of the operating environments of the processor circuits 150 and 250 executing respective ones of the control routines 140 and 240 to perform the aforedescribed functions are depicted. This depiction of a portion of this variant of the computing device 1000 of FIG. 3 is similar in many ways to the depiction of a portion of the computing device 1000 of FIG. 1 that is provided by FIG. 2, and again, like reference numerals are used to refer to like elements throughout. However, the incorporation of the signal lines 201 and 205-209 in the variant of FIG. 3 enables functionality associated with the control routines 140 and 240 that was not available in the variant of FIG. 1.

Turning to the configuration component 142, in addition to causing the processor circuit 150 to access the threshold register 232 (or to employ some other mechanism) to specify voltage level thresholds as triggers causing the controller 200 to take selected action, the processor circuit 150 may be further caused to access the control register 233 (or to employ some other mechanism) to specify status signals from one or more components as triggers also causing the controller 200 to take one or more selected actions. Alternatively or additionally, in addition to specifying signaling the processor circuit 150 and/or altering the provision of electric power via the power conductors 101 and 106-109 as possible selected actions for the controller 200 to take, the processor circuit 150 may be further caused to access the control register 233 (or to employ some other mechanism) to specify the signaling of components via one or more of the signal conductors 201 and 205-209 to reduce their power consumption as possible selected actions for the controller 200 to take.

Turning to the monitoring component 141, in addition to causing the processor circuit 150 to communicate with the controller 200 (via the interrupt register 251 or via another communications mechanism) to obtain information concerning voltage levels and/or what components are subjected to reductions or cessations in the provision of electric power by the controller 200, the processor circuit 150 may additionally be caused to obtain information concerning which components have indicated current consumption of relatively high amounts of electric power, which components have indicated imminent consumption of such high amounts of electric power, and/or which components have been signaled to reduce their electric power consumption. Thus, the processor circuit 150 may be caused to obtain information in greater detail concerning the provision and use of electric power by components of the computing device 1000.

The control routine 140 may additionally comprise a coordination component 143 executable by the processor circuit 150 to signal other routines (not shown) with indications of what components are subjected by the controller 200 to restrictions in their consumption of electric power to enable the performance by the processor circuit 150 of tasks desired by a user of the computing device 1000 in a manner that takes into account the effects of such restrictions. By way of example, where the camera 110 has been signaled by the controller 200 to reduce the amount of electric power it employs in operating the flash 115, the processor circuit 150 may be caused to employ indications it receives about the camera 110 being so signaled to alter the manner in which the processor circuit 150 operates the camera 110 to take a picture. Specifically, the processor circuit 150 may be caused to employ some form of color, lighting and/or other image processing algorithm to compensate for the resulting reduction in light provided by the flash 115. By way of another example, where a wireless transceiver of the interface controller 195b consumes considerable power in boosting signal strength to accommodate a weak wireless signal and has signaled the controller 200 about such use of electric power, the processor circuit 150 may employ indications of such power use by the interface controller 195b to refrain from acting to undo restrictions that the controller 200 has placed on the use of electric power for backlighting of the display 180, amplification of audio by the audio amplifier 175, and/or operation of the processor 150 through signaling the clock 151 to reduce its processor clock rate.

Turning to the monitoring component 242, in addition to responding to reductions in the voltage level of the provision of electric power by the power source 105 as a trigger to take a selected action specified by the processor circuit 150 (via the control register 233 or via whatever other form of communication therefrom), the processor circuit 250 may additionally be caused to recurringly access the status register 234 of the power control interface 204 (or to in some other way recurringly monitor the power control interface 204) for instances of signals received from one or more of the components 110, 151, 165c, 170, 185 and 195b indicating current or imminent relatively high electric power consumption. Again, such signals may be received from one or more of these components via one or more of the signal conductors 201 and 205-209. As has been discussed, signals received via the signal conductors 201 and 205-209 indicating current and/or imminent high consumption of electric power may be used as triggers for the controller 200 to take selected action, as well as a reduction in the voltage level at which the power source 105 provides electric power.

Turning to the response component 243, in addition to signaling the processor circuit 150 and/or operating the power switching components 203 to alter the provision of electric power via one or more of the power conductors 101 and 106-109, the processor circuit 250 may additionally be caused to operate the power control interface 204 to transmit signals via one or more of the signal conductors 201 and 205-209 to one or more of the components 110, 151, 165c, 170, 185 or 195b to reduce and/or delay their consumption of electric power. The processor circuit 250 may be further caused to access the control register 233 (or to employ some other mechanism) to receive indications from the processor circuit 150 of what circumstances under which the processor circuit 250 would send such signals to one or more of those components. Examples of such circumstances may be acting to prevent certain combinations of highly power consumptive features from being used simultaneously, possibly by responding to a signal received from a component that indicates imminent use of power for one feature with a signal to that component to stop it from doing so, at least until another signal is received from another component implementing another feature to the effect that it has stopped consuming a high amount of electric power for that other feature.

Further, the processor circuit 250 may also receive an indication from the processor circuit 150 that the manner in which such signals may be used to cause those components to reduce their power consumption may have a latching or "sticky" characteristic in which the processor circuit 200 independently acts to signal those components to reduce their power consumption, but the processor circuit 200 then waits for a signal from the processor circuit 150 to undo the imposition of that restriction. Such waiting may include insertion of a specified debounce period in which the processor circuit 250 delays signaling the processor circuit 150 with an indication that a voltage level has risen above a particular voltage level threshold until that voltage level has remained above that voltage level threshold for at least the duration of that debounce period. In this way, the processor circuit 250 is caused to avoid indicating a rise above that threshold caused by unsteadiness in the voltage level, and not a genuine change in power consumption from cessation of power consumption by a component implementing a feature.

The ability to receive signals from highly power-consumptive components indicating current and/or upcoming use of high amounts of electric power, and the ability to signal individual ones of those components to alter their consumption of electric power, enables a greater degree of control over the distribution and use of electric power within the computing device 1000 by controller 200, and independently of the processor circuit 150. Further, greater flexibility in implemented a staged response reflective of priorities of use of the computing device 1000 is enabled.

By way of example, where the computing device 1000 is a smartphone such that its primary use is envisioned to be wireless voice communications, the controller 200 may be configured by the processor circuit 150 to give priority to the provision of electric power to a transceiver of the interface controller 195b and to the audio amplifier 175 over other highly power-consumptive components. Specifically, the processor circuit 150 may signal the processor circuit 250 (via the registers 232-233 or via a different mechanism) to respond to a reduction in the voltage level at which the power source 105 provides electric power down to a higher first voltage level threshold by initially imposing restrictions on the amount of electric power allowed for use in operating the flash 115 and any backlighting of the display 180. Such restrictions may comprise only reductions in the amount of illumination provided by either of these such that display backlighting and flash photography are still available so as to minimize the degree to which a user's experience in using the computing device 1000 is affected. In this way, the user is still able to make use of the camera 110 to take pictures and the display 180 to view information, but without as much illumination. Alternatively or additionally, the processor circuit 250 may be caused to respond by disallowing use of electric power in operating the vibration motor 173 to provide haptic feedback for operation of controls of the computing device 1000—operation of controls remains possible, but without the provision of tactile feel that acknowledges each button press. Also alternatively or additionally, the processor circuit 250 may signal the clock 151 (possibly via the power control interface 204 and the signal conductor 205) to reduce the processor clock speed for the processor circuit 150 to reduce its power consumption, but possibly while still keeping the voltage level of the power provided to the processor circuit 150 at an unchanged level to enable the processor circuit 150 to be more readily brought back to a higher processor clock speed without incurring a delay to await return of the voltage provided to the processor circuit 150 to a higher voltage level that would enable use of that higher processor clock speed.

Further, the processor circuit 150 may also signal the processor circuit 250 to respond to a greater reduction in that voltage level below a lower second voltage level threshold by imposing more stringent restrictions on the operation of the flash 115, any backlighting provided for the display 180 and/or any use of the vibration motor 173. Such increased restrictions may comprise immediately disabling one or both of display backlighting or flash photography, either by the processor circuit 250 operating one or more of the power switching components 203 to cease providing electric power via the power conductors 108 or 101 for these functions, or by the processor circuit 250 operating the power control interface 204 to use the signal conductors 208 or 201 to signal the display interface 185 or the camera 110, respectively, to cease using electric power for those aspects of the visual display or picture taking functions. The processor circuit 250 may further signal the processor circuit 150 of the greater fall in that voltage level and/or of the selected actions that the processor circuit 250 has taken in response, thereby enabling the processor circuit 150 (in executing the presentation component 148) to present a user of the computing device 1000 with a notice concerning the current state of the power source 105 and/or of the fact that display backlighting for graphics display and/or flash lighting for photography have been disabled in an effort to conserve power. The processor circuit 250 may still further disallow the provision of electric power for any use of the vibration motor 173 and/or may signal the processor circuit 150 to switch to use of the audio subsystem with a reduced volume level to provide a "ring" indication for receiving incoming calls/messages. The processor circuit 250 may further both signal the clock 151 to reduce the processor clock speed for the processor circuit 150 (if this hasn't already been done) and reduce the voltage of the electric power provided to the processor circuit 150.

Figure 5:
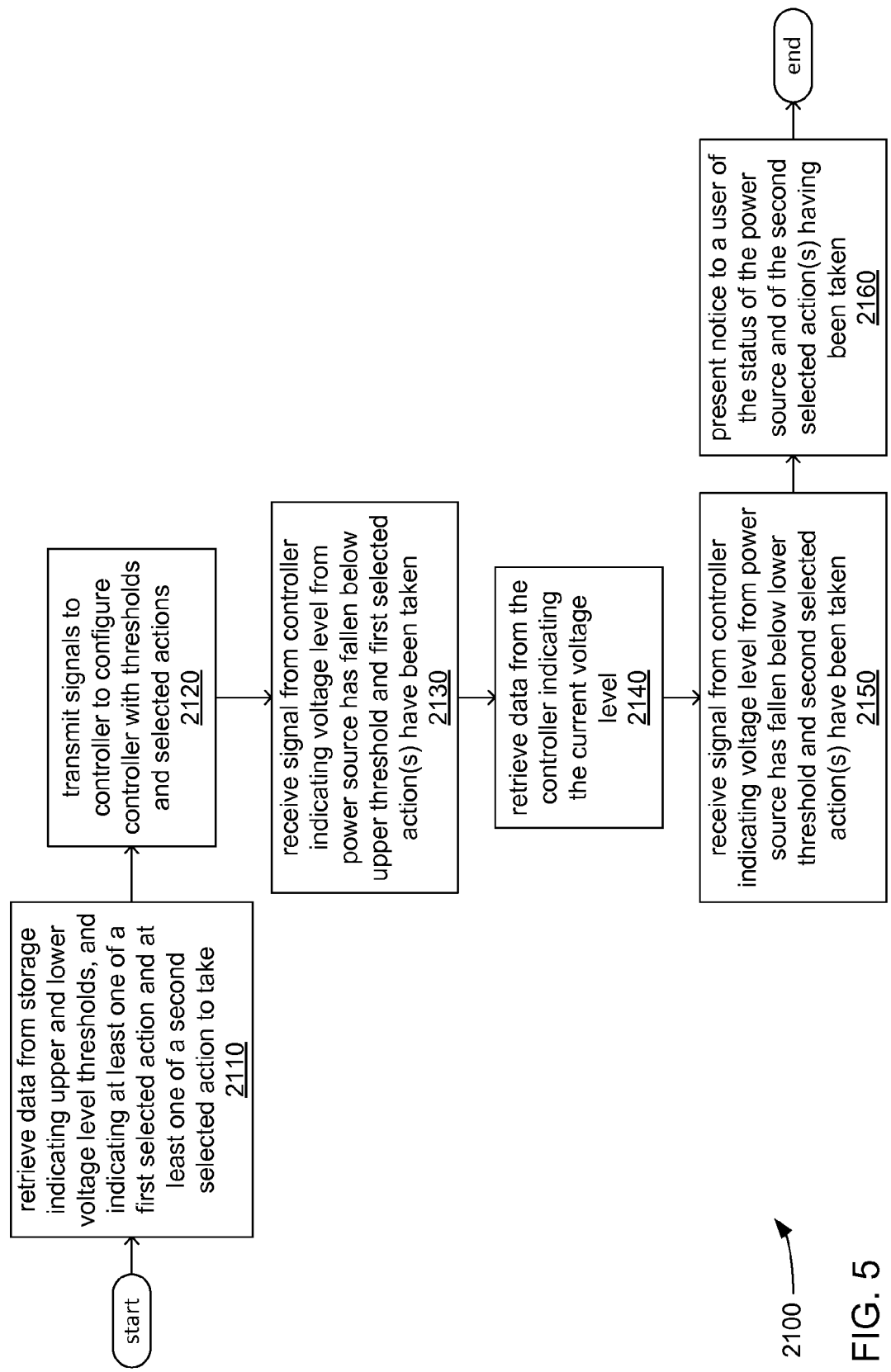
FIG. 5 illustrates an embodiment of a first logic flow.

FIG. 5 illustrates an embodiment of a logic flow 2100. The logic flow 2100 may be representative of some or all of the operations executed by one or more embodiments described herein. More specifically, the logic flow 2100 may illustrate operations performed by components of the computing device 1000, including the processor circuit 150 in executing at least the control routine 140 and/or other components of the computing device 1000.

At 2110, a main processor circuit of a computing device (e.g., the processor circuit 150 of the computing device 1000) retrieves data from a storage of the computing device (e.g., the storage 160). That data indicates upper and lower voltage level thresholds against which to compare the voltage level of electric power provided by a power source of the computing device (e.g., the power source 105). The data also indicates at least one of a first selected action and at least one of a second action selected action to take in response to that voltage level falling below the higher and lower voltage level thresholds, respectively.

At 2120, the main processor circuit signals to a controller of the computing device (e.g., the controller 200) to configure the controller with the thresholds and the selected actions. As has been discussed, such configuration may be done by the main processor circuit writing to registers of the controller that are made accessible to the main processor circuit (e.g., the registers 232, 233 and/or 234 via the coupling 155), or it may be done in any of a variety of other ways by which the main processor circuit is able to transmit such data to the controller.

At 2130, the main processor circuit receives a signal from the controller indicating that the voltage level of the electric power output by the power source has fallen below the upper voltage level threshold and that the first selected action(s) have been taken. As previously discussed, a selected action taken by such a controller may comprise operating power switching components (e.g., the power switching components 203) to directly restrict electric power provided to a component via a power conductor (e.g., one of the power conductors 101 and 106-109), or may comprise signaling a component via a signal conductor (e.g., one of the signal conductors 201 and 205-209) with a command to reduce its electric power consumption.

At 2140, the main processor circuit retrieves data from the controller indicating the current voltage level of the electric power provided by the power source. As has been discussed, this may be done by the main processor circuit accessing an interrupt or other register (e.g., the interrupt register 251) to read one or more bits indicating a voltage level measured by a voltage detector (e.g., the voltage detector 202), or by another mechanism enabling such data to be transmitted from the controller to the main processor circuit. As has also been discussed, it may be that the main processor circuit may act to undo a selected action once that voltage level has risen back above a voltage level threshold.

At 2150, the main processor circuit receives a signal from the controller indicating that the voltage level of the electric power output by the power source has fallen below the lower voltage level threshold and that the second selected action(s) have been taken.

At 2160, in response to receiving this indication of the voltage level having fallen further, the main processor circuit is caused to present a notice to a user of the computing device of the current status of the power source and/or of the second selected action that has been taken. As has been discussed, this presentation may be made visually (e.g., using the display 180), audibly (e.g., using the acoustic driver 171), or in any of a variety of other ways to convey such information to a user. As has also been discussed, as the voltage level of the electric power provided by such a power source falls further, the selected action taken by the controller ceases to be relatively minor actions that minimize the effect on the ability of a user to use the computing device, and become more substantial actions that likely interfere with a user's ability to use one or more features of the computing device. And thus, such a presentation to a user may be intended to inform that user that such action has been taken and that one or more features of the computing device have been disabled to at least some degree.

Figure 6:
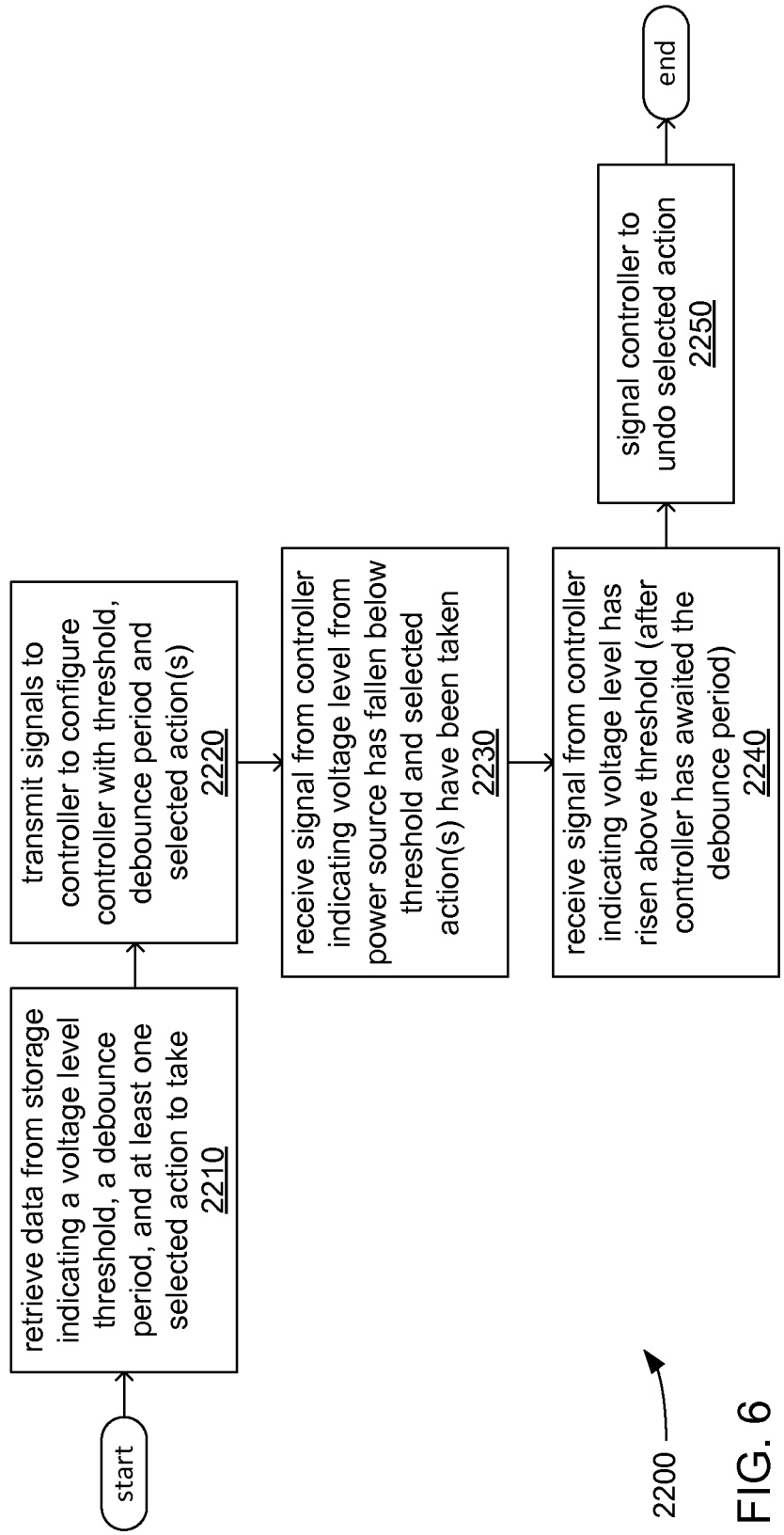
FIG. 6 illustrates an embodiment of a second logic flow.

FIG. 6 illustrates an embodiment of a logic flow 2200. The logic flow 2200 may be representative of some or all of the operations executed by one or more embodiments described herein. More specifically, the logic flow 2200 may illustrate operations performed by components of the computing device 1000, including the processor circuit 150 in executing at least the control routine 140 and/or other components of the computing device 1000.

At 2210, a main processor circuit of a computing device (e.g., the processor circuit 150 of the computing device 1000) retrieves data from a storage of the computing device (e.g., the storage 160). That data indicates a voltage level threshold against which to compare the voltage level of electric power provided by a power source of the computing device (e.g., the power source 105), a debounce period to await after a voltage level rises above a threshold, and one or more selected actions to take in response to that voltage level falling below that voltage level threshold.

At 2220, the main processor circuit signals to a controller of the computing device (e.g., the controller 200) to configure the controller with the threshold, the debounce period and the selected action(s). At 2230, the main processor circuit receives a signal from the controller indicating that the voltage level of the electric power output by the power source has fallen below the voltage level threshold and that the selected action(s) have been taken.

At 2240, the main processor circuit retrieves data from the controller indicating that the current voltage level of the electric power provided by the power source has risen above the threshold voltage level for at least the duration of the debounce period. Again, as has been discussed, the configuring of the controller to set thresholds, set debounce periods, specify actions, the indication of a voltage level falling beneath a threshold, and the indication of a voltage level rising above a threshold for at least the duration of a debounce period may all be done by the main processor circuit accessing registers made available to the main processor circuit by the controller (e.g., the registers 232-234 and 251 via the coupling 155), may be done through interrupt signaling or may be done in any of a variety of other ways by which the main processor circuit and the controller are able to exchange signals.

At 2250, in response to the voltage level of the electric power provided by the power source having again risen above the voltage level threshold for the duration of the debounce period, the main processor circuit signals the controller to undo the selected action.

Figure 7:
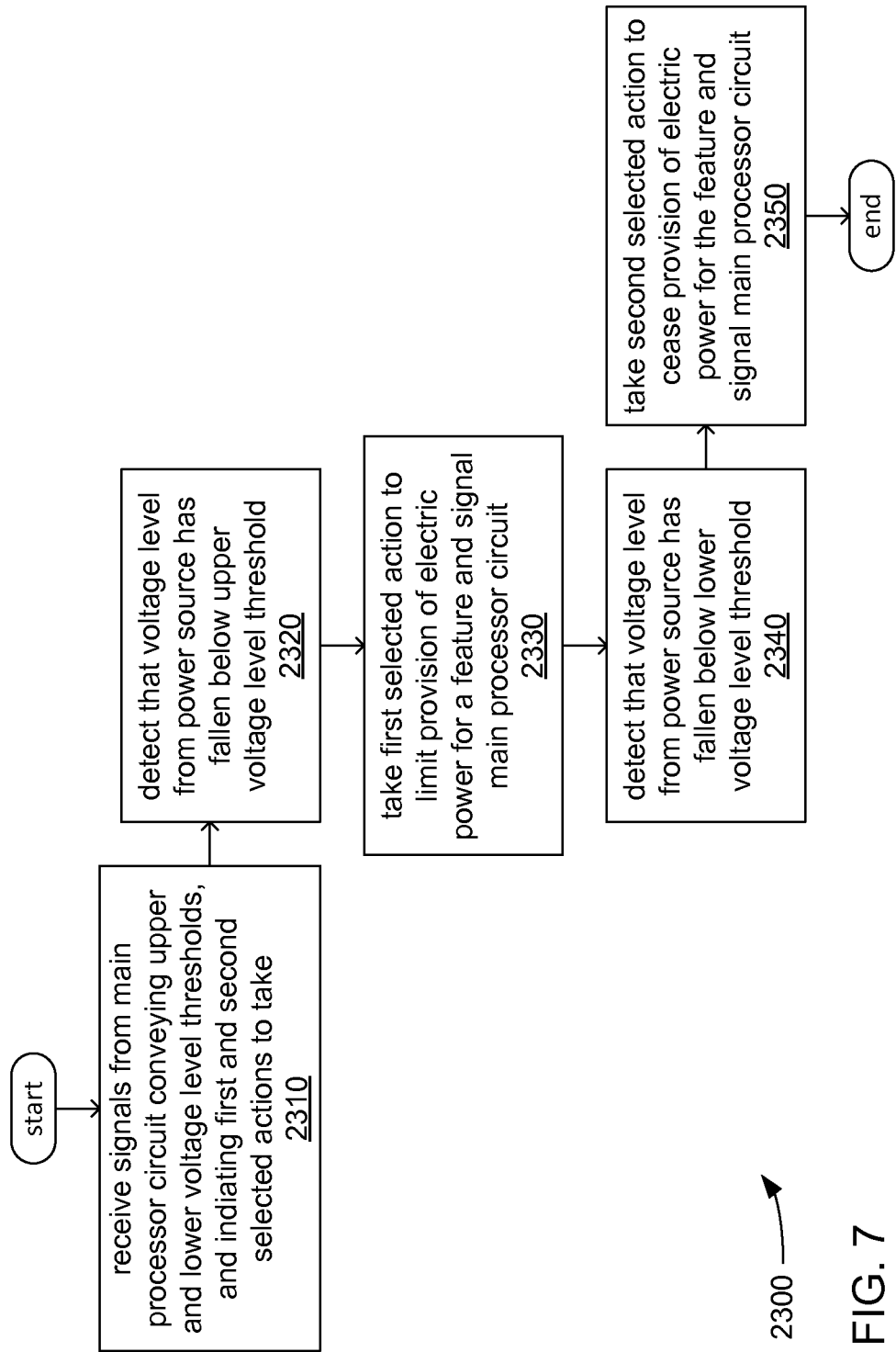
FIG. 7 illustrates an embodiment of a third logic flow.

FIG. 7 illustrates an embodiment of a logic flow 2300. The logic flow 2300 may be representative of some or all of the operations executed by one or more embodiments described herein. More specifically, the logic flow 2300 may illustrate operations performed by components of the controller 200, including the processor circuit 250 in executing at least the control routine 240 and/or other components of the controller 200.

At 2310, a controller processor circuit of a controller of a computing device (e.g., the processor circuit 250 of the controller 200 of the computing device 1000) receives signals from a main processor circuit of the computing device (e.g., the processor circuit 150) conveying data retrieved from a storage of the computing device (e.g., the storage 160) with which the controller is to be configured. That data indicates upper and lower voltage level thresholds against which to compare the voltage level of electric power provided by a power source of the computing device (e.g., the power source 105). The data also indicates first and second selected actions to take in response to that voltage level falling below the higher and lower voltage level thresholds, respectively. As has been discussed, such configuration may be done by the main processor circuit writing to registers of the controller that are made accessible to the main processor circuit (e.g., the registers 232, 233 and/or 234 via the coupling 155), or it may be done in any of a variety of other ways by which the main processor circuit is able to transmit such data to the controller.

At 2320, the controller processor circuit detects that the voltage level of the electric power output by the power source has fallen below the upper voltage level threshold. In response, at 2330, the controller processor circuit takes the first selected action and signals the main processor circuit concerning the reduced voltage level and that the first selected action has been taken. As previously discussed, a selected action taken by such a controller may comprise operating power switching components (e.g., the power switching components 203) to directly restrict electric power provided to a component via a power conductor (e.g., one of the power conductors 101 and 106-109), or may comprise signaling a component via a signal conductor (e.g., one of the signal conductors 201 and 205-209) with a command to reduce its electric power consumption. Such selected actions are meant to conserve power in a manner that is meant have only minimal effect on the manner in which a user may use the computing device, as has also been discussed.

At 2340, the controller processor circuit detects that the voltage level of the electric power output by the power source has fallen below the lower voltage level threshold. In response, at 2350, the controller processor circuit takes the second selected action and signals the main processor circuit concerning the further reduced voltage level and that the second selected action has been taken. As previously discussed, a selected action taken by such a controller in response to a further reduction in the voltage level of the electric power provided by the power source may comprise operating power switching components to directly cease the provision of electric power to a component via a power conductor, or may comprise signaling a component via a signal conductor with a command to cease use of electric power for at least some aspect of a feature provided via the component. Such selected actions are likely to deprive a user of the computing device of one or more features of the computing device for the sake of conserving electric power. Signaling the main processor circuit concerning the further reduction in voltage level and/or the taking of such more stringent actions enables the main processor circuit to present such information to a user of the computing device, as has also been discussed.

Figure 8:
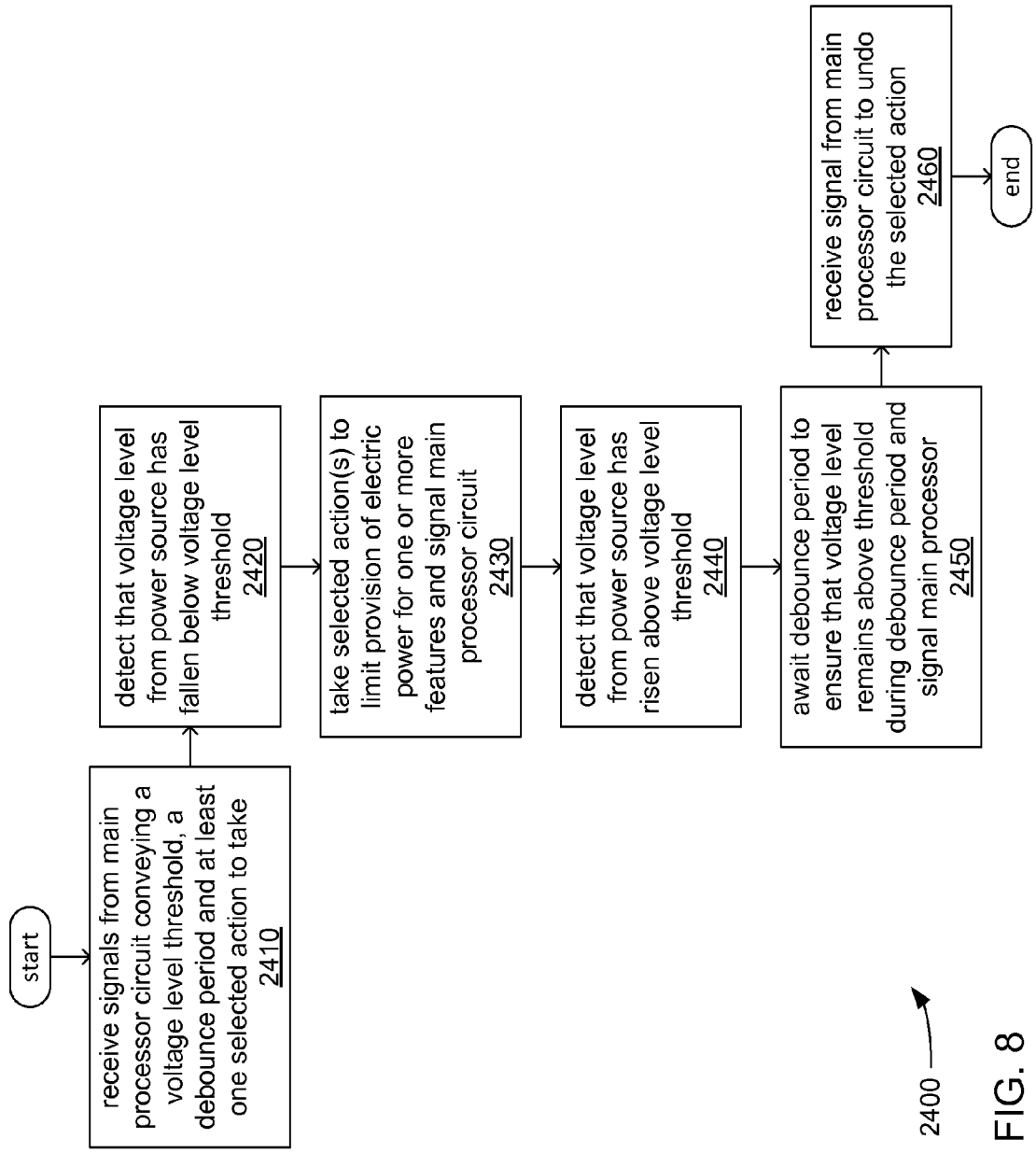
FIG. 8 illustrates an embodiment of a fourth logic flow.

FIG. 8 illustrates an embodiment of a logic flow 2400. The logic flow 2400 may be representative of some or all of the operations executed by one or more embodiments described herein. More specifically, the logic flow 2400 may illustrate operations performed by components of the controller 200, including the processor circuit 250 in executing at least the control routine 240 and/or other components of the controller 200.

At 2410, a controller processor circuit of a controller of a computing device (e.g., the processor circuit 250 of the controller 200 of the computing device 1000) receives signals from a main processor circuit of the computing device (e.g., the processor circuit 150) conveying data retrieved from a storage of the computing device (e.g., the storage 160) with which the controller is to be configured. That data indicates a voltage level threshold against which to compare the voltage level of electric power provided by a power source of the computing device (e.g., the power source 105), a debounce period to await after the voltage level has risen above a voltage level threshold, and at least one selected action to take in response to that voltage level falling below the voltage level threshold. As has been discussed, such configuration may be done by the main processor circuit writing to registers of the controller that are made accessible to the main processor circuit (e.g., the registers 232, 233 and/or 234 via the coupling 155), or it may be done in any of a variety of other ways by which the main processor circuit is able to transmit such data to the controller.

At 2420, the controller processor circuit detects that the voltage level of the electric power output by the power source has fallen below the voltage level threshold. In response, at 2430, the controller processor circuit takes the selected action(s) and signals the main processor circuit concerning the reduced voltage level and that the first selected action(s) have been taken.

At 2440, the controller processor circuit detects that the voltage level of the electric power output by the power source has risen above the voltage level threshold. In response, at 2450, the controller processor circuit awaits the duration of the debounce period to ensure that the voltage level remains above the voltage threshold level for at least that period of time, then signals the main processor circuit with an indication that the voltage level has risen above the voltage level threshold.

At 2460, the controller receives a signal from the main processor circuit to undo the selected action(s).

Figure 9:
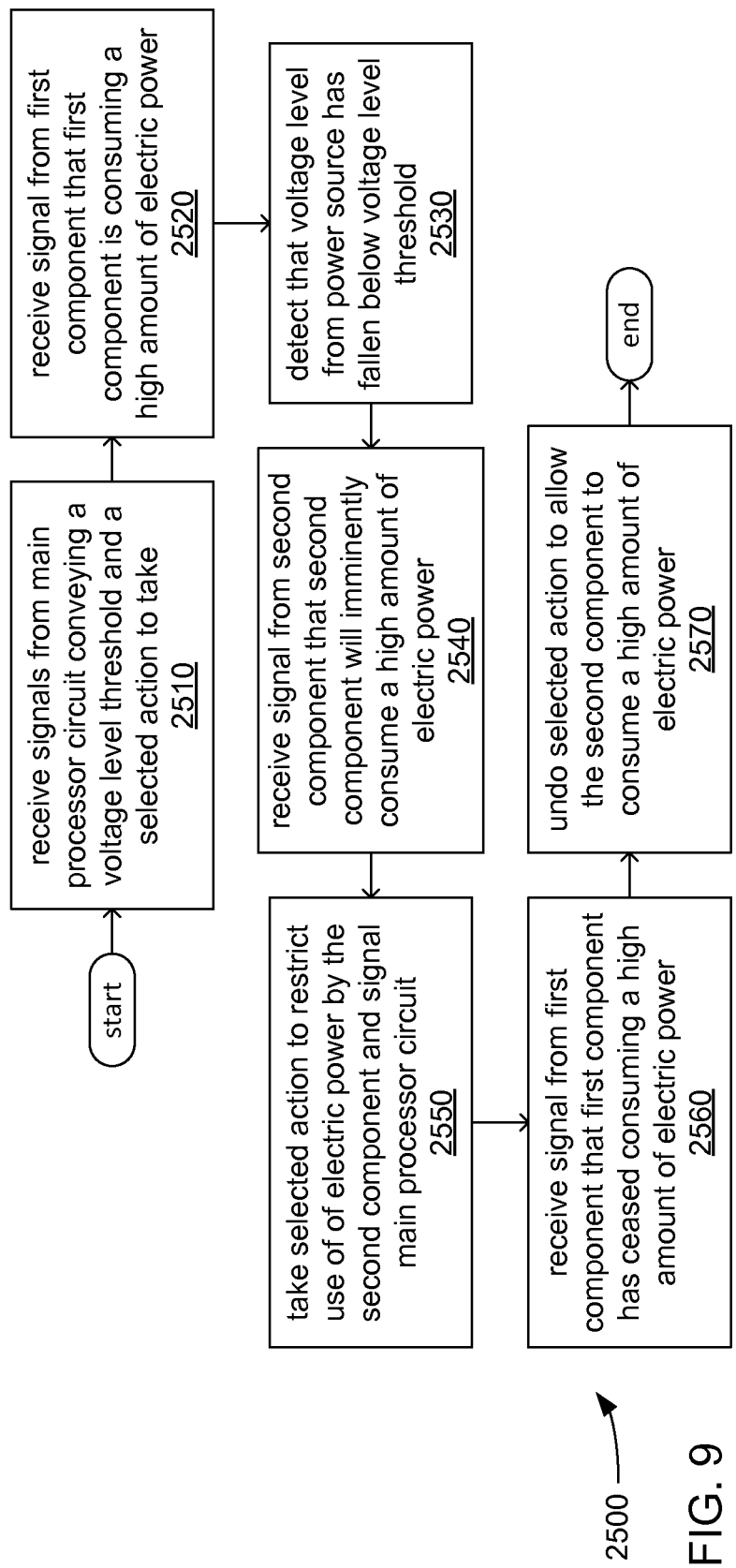
FIG. 9 illustrates an embodiment of a fifth logic flow.

FIG. 9 illustrates an embodiment of a logic flow 2500. The logic flow 2500 may be representative of some or all of the operations executed by one or more embodiments described herein. More specifically, the logic flow 2500 may illustrate operations performed by components of the controller 200, including the processor circuit 250 in executing at least the control routine 240 and/or other components of the controller 200.

At 2510, a controller processor circuit of a controller of a computing device (e.g., the processor circuit 250 of the controller 200 of the computing device 1000) receives signals from a main processor circuit of the computing device (e.g., the processor circuit 150) conveying data retrieved from a storage of the computing device (e.g., the storage 160) with which the controller is to be configured. That data indicates a voltage level threshold against which to compare the voltage level of electric power provided by a power source of the computing device (e.g., the power source 105), and a selected action to take in response to that voltage level falling below the voltage level threshold.

At 2520, the controller processor circuit receives a signal from a first component that the first component is currently consuming a high amount of electric power. As has been discussed, the controller may be coupled to one or more highly power-consumptive components via signal conductors by which the controller may receive status from those components concerning their power consumption and/or by which the controller may transmit signals commanding those components to alter their electric power consumption.

At 2530, the controller processor circuit detects that the voltage level of the electric power output by the power source has fallen below the voltage level threshold, and at 2540, the controller processor circuit receives a signal from a second component that the second component is imminently about to start consuming a high amount of electric power. In response, at 2550, the controller processor circuit takes the selected action, either signaling the second component to restrict its consumption of electric power or acting to restrict the provision of electric power to the second component. The controller processor circuit also responds by signaling the main processor circuit concerning the reduced voltage level and that the selected action has been taken. As previously discussed, the controller may be configured to take a selected action in response to a signal received from a component in addition to or as an alternative to responding to receipt of an indication of a reduction in a voltage level.

At 2560, the controller processor receives a signal from the first component that the first component has ceased consuming a high amount of electric power. In response, at 2570, the controller processor acts to undo its imposition of a restriction on the consumption of electric power by the second component. This exemplifies the manner in which a prioritization of the provision of electric power to one component over another may be enforced by the controller. Specifically, in response to the indication from the first component that it was consuming a high amount of electric power and the indication of a drop in voltage level, the controller acted to prevent the second component from also drawing a high amount of electric power until after the first component had signaled that it had ceased to do so. In this way, the controller acted to attempt to prevent a further drop in the voltage level of the electric power provided by the power source.

Figure 10:
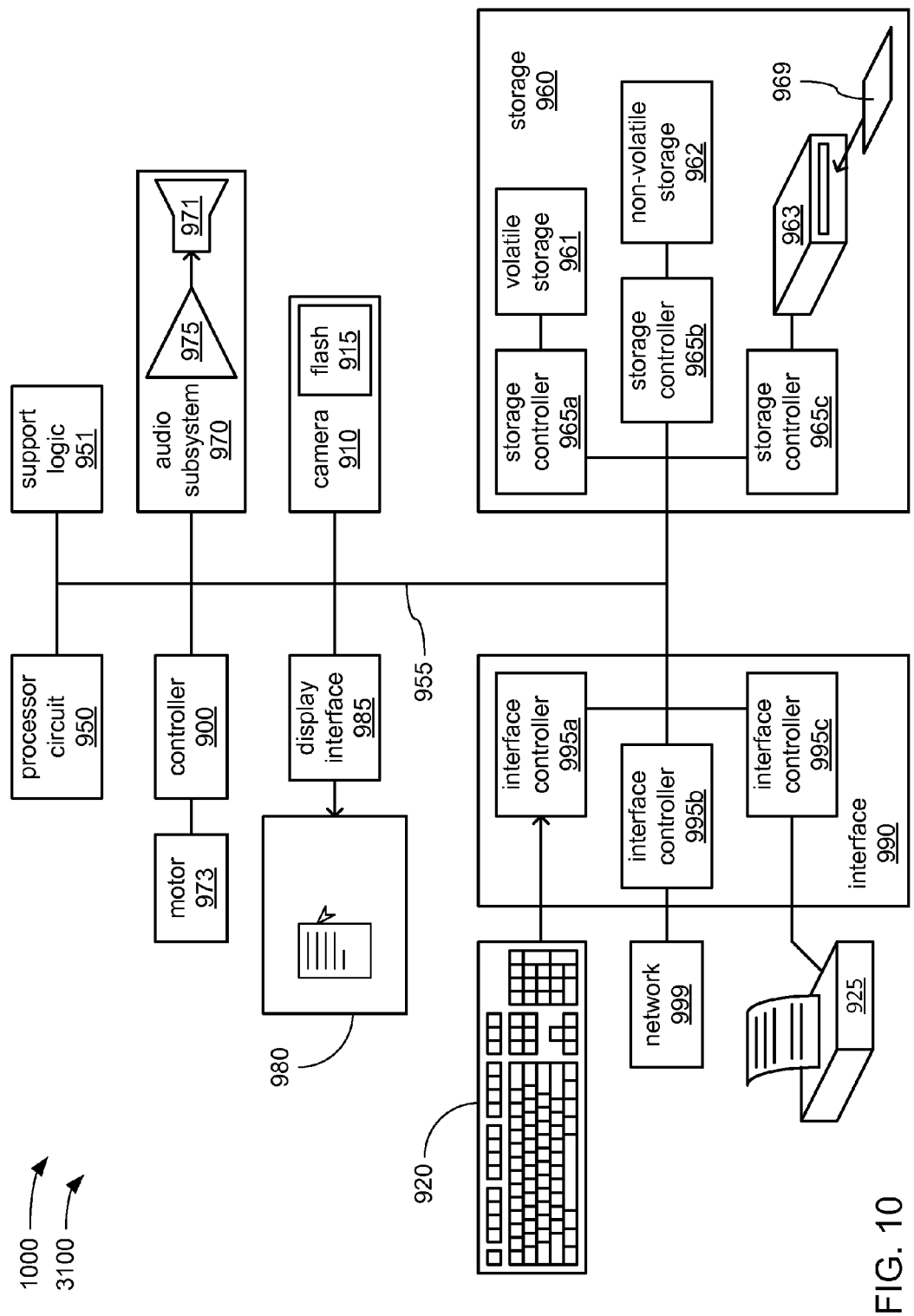
FIG. 10 illustrates an embodiment of a processing architecture.

FIG. 10 illustrates an embodiment of an exemplary processing architecture 3100 suitable for implementing various embodiments as previously described. More specifically, the processing architecture 3100 (or variants thereof) may be implemented as part of the computing device 1000, and/or within the controller 200. It should be noted that components of the processing architecture 3100 are given reference numbers in which the last two digits correspond to the last two digits of reference numbers of components earlier depicted and described as part of each of the computing device 1000 and the controller 200. This is done as an aid to correlating such components of whichever ones of the computing device 1000 and the controller 200 may employ this exemplary processing architecture in various embodiments.

The processing architecture 3100 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor circuit, the processor circuit itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3100, a computing device comprises at least a processor circuit 950, support logic 951, a storage 960, a controller 900, an interface 990 to other devices, and coupling 955. As will be explained, depending on various aspects of a computing device implementing the processing architecture 3100, including its intended use and/or conditions of use, such a computing device may further comprise additional components, such as without limitation, a camera 910 comprising a flash 915, an audio subsystem 970 comprising an audio amplifier 975 and an acoustic driver 971, and a display interface 985.

The controller 900 corresponds to the controller 200. As previously discussed, the controller 200 may implement the processing architecture 3100. Thus, in essence, the controller 200 could be regarded, at least to some extent, as a computing device embedded within the computing device 1000. As such, the controller 200 may perform various functions, including those that have been described at length herein, in support of the computing device 1000 performing various functions. Further, the controller 900 may be accompanied by a motor 973 (corresponding to the motor 173) of rotary, linear or other configuration to provide vibration to indicate an incoming call and/or to provide haptic feedback to an operator.

Coupling 955 is comprised of one or more buses, point-to-point interconnects, transceivers, buffers, crosspoint switches, and/or other conductors and/or logic that communicatively couples at least the processor circuit 950 to the storage 960. Coupling 955 may further couple the processor circuit 950 to one or more of the interface 990, the camera 910, the audio subsystem 970 and the display interface 985 (depending on which of these and/or other components are also present). With the processor circuit 950 being so coupled by couplings 955, the processor circuit 950 is able to perform the various ones of the tasks described at length, above, for whichever ones of the computing device 1000 and the controller 200 implement the processing architecture 3100. Coupling 955 may be implemented with any of a variety of technologies or combinations of technologies by which signals are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, I2C, SPI, USB, and the like.

As previously discussed, the processor circuit 950 (corresponding to one or more of the processor circuits 150 and 250) may comprise any of a wide variety of commercially available processors, employing any of a wide variety of technologies and implemented with one or more cores physically combined in any of a number of ways.

As previously discussed, the storage 960 (corresponding to one or more of the storages 160 and 260) may comprise one or more distinct storage devices based on any of a wide variety of technologies or combinations of technologies. More specifically, as depicted, the storage 960 may comprise one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly comprising multiple distinct types of storage is in recognition of the commonplace use of more than one type of storage device in computing devices in which one type provides relatively rapid reading and writing capabilities enabling more rapid manipulation of data by the processor circuit 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 955 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and comprises one or more ferromagnetic and/or solid-state disk drives, the non-volatile storage 962 may be communicatively coupled to coupling 955 through a storage controller 965b providing an appropriate interface to the non-volatile storage 962 that perhaps employs addressing of blocks of information and/or of cylinders and sectors. By way of still another example, where the removable media storage 963 is present and comprises one or more optical and/or solid-state disk drives employing one or more pieces of machine-readable storage medium 969 (possibly corresponding to the storage medium 169), the removable media storage 963 may be communicatively coupled to coupling 955 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may comprise an article of manufacture in the form of a machine-readable storage media on which a routine comprising a sequence of instructions executable by the processor circuit 950 may be stored, depending on the technologies on which each is based. By way of example, where the non-volatile storage 962 comprises ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may comprise banks of solid-state storage devices to store information, such as sequences of instructions, in a manner akin to a compact flash card. Again, it is commonplace to employ differing types of storage devices in a computing device at different times to store executable routines and/or data. Thus, a routine comprising a sequence of instructions to be executed by the processor circuit 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor circuit 950 as that routine is executed.

As previously discussed, the interface 990 (possibly corresponding to the interface 190) may employ any of a variety of signaling technologies corresponding to any of a variety of communications technologies that may be employed to communicatively couple a computing device to one or more other devices. Again, one or both of various forms of wired or wireless signaling may be employed to enable the processor circuit 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as comprising multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network comprising one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, laser printers, inkjet printers, mechanical robots, milling machines, etc.

Where a computing device is communicatively coupled to (or perhaps, actually comprises) a display (e.g., the depicted example display 980, corresponding to the display 180), such a computing device implementing the processing architecture 3100 may also comprise the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, display serial interface (DSI), etc.

More generally, the various elements of the computing device 1000 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

An example of a controller includes logic, at least a portion of which is implemented in hardware, to receive configuration data from a main processor circuit that specifies a first voltage level threshold and a first selected action to take to reduce electric power provided to a first component to provide a first feature in response to a voltage level of a power source falling below the first voltage level threshold, based on the voltage level of the power source falling below the first voltage level threshold, take the first selected action, and transmit a signal to the main processor circuit that indicates that the voltage level of the power source has fallen below the first voltage level threshold and the first selected action has been taken, and based on the voltage level of the power source rising above the first voltage level threshold after falling below the first voltage level threshold, await a debounce period and transmit a signal to the main processor circuit that indicates that the voltage level of the power source has risen above the first voltage level threshold.

The above example of a controller in which the logic is to receive a signal from the main processor circuit to undo the first selected action and act to undo the first selected action.

Either of the above examples of a controller in which the configuration data specifying a second voltage level threshold lower than the first voltage level threshold and a second selected action for the controller to take to conserve electric power in response to the voltage level of a power source falling below the second voltage level threshold; and the logic to take the second selected action and transmit a signal to the main processor circuit that indicates that the voltage level of the power source has fallen below the second voltage level threshold and the second selected action has been taken based on the voltage level of the power source falling below the second voltage level threshold.

Any of the above examples of a controller in which the first selected action includes the logic acting to reduce an amount of electric power consumed by the first component while still enabling the first component to provide the first feature, and the second selected action comprising the logic acting to cease provision of electric power to the first component to disable provision of the first feature.

Any of the above examples of a controller in which the controller includes a power switching component to control provision of electric power to the first component, the first selected action comprising the logic operating the power switching component to reduce provision of electric power to the first component, the second selected action comprising the logic operating the power switching component to cease provision of electric power to the first component, and the first component comprising one of a camera comprising a flash, a vibration motor, an audio subsystem comprising an audio amplifier, a graphics interface conveying electric power to support a backlight of a display, and an interface controller comprising a wireless transceiver.

Any of the above examples of a controller in which the first selected action includes the logic signaling the first component to reduce its consumption of electric power to provide the first feature, the second selected action comprising the logic signaling the second component to cease its consumption of electric power to provide the first feature, and the first component comprising one of a camera comprising a flash, a vibration motor, an audio subsystem comprising an audio amplifier, a graphics interface conveying electric power to support a backlight of a display, an interface controller comprising a wireless transceiver, a clock circuit that provides a clock signal to the main processor circuit.

Any of the above examples of a controller in which the logic is to receive a signal from a second component that indicates that the second component is consuming a relatively high amount of electric power from the power source, receive a signal from the first component that indicates that the first component is imminently about to consume a relatively high amount of electric power from the power source, and based on the voltage level of the power source falling below the first voltage level threshold and the signal from the second component indicating it is consuming a relatively high amount of electric power, signal the first component to refrain from consuming a relatively high amount of electric power as the first selected action.

An example of at least one machine-readable storage medium includes instructions that when executed by a controller, cause the controller to receive configuration data from a main processor circuit that specifies a first voltage level threshold and a first selected action to take to reduce electric power provided to a first component to provide a first feature in response to a voltage level of a power source falling below the first voltage level threshold; based on the voltage level of the power source falling below the first voltage level threshold, take the first selected action, and transmit a signal to the main processor circuit that indicates that the voltage level of the power source has fallen below the first voltage level threshold and the first selected action has been taken; and based on the voltage level of the power source rising above the first voltage level threshold after falling below the first voltage level threshold, await a debounce period and transmit a signal to the main processor circuit that indicates that the voltage level of the power source has risen above the first voltage level threshold.

The above example of at least one machine-readable storage medium in which the controller is caused to receive a signal from the main processor circuit to undo the first selected action, and act to undo the first selected action.

Either of the above examples of at least one machine-readable storage medium in which the configuration data specifying a second voltage level threshold lower than the first voltage level threshold and a second selected action for the controller to take to conserve electric power in response to the voltage level of a power source falling below the second voltage level threshold; and the controller is caused to take the second selected action and transmit a signal to the main processor circuit that indicates that the voltage level of the power source has fallen below the second voltage level threshold and the second selected action has been taken based on the voltage level of the power source falling below the second voltage level threshold.

Any of the above examples of at least one machine-readable storage medium in which the first selected action comprising the logic acting to reduce an amount of electric power consumed by the first component while still enabling the first component to provide the first feature, and the second selected action comprising the logic acting to cease provision of electric power to the first component to disable provision of the first feature.

Any of the above examples of at least one machine-readable storage medium in which the controller caused to receive a signal from a second component that indicates that the second component is consuming a relatively high amount of electric power from the power source; receive a signal from the first component that indicates that the first component is imminently about to consume a relatively high amount of electric power from the power source; and based on the voltage level of the power source falling below the first voltage level threshold and the signal from the second component indicating it is consuming a relatively high amount of electric power, signal the first component to refrain from consuming a relatively high amount of electric power as the first selected action.

An example of an apparatus includes a main processor circuit and logic to transmit configuration data to a controller that controls distribution of electric power provided by a power source, the configuration data specifying a first voltage level threshold and a first selected action for the controller to take to conserve electric power in response to a voltage level of the power source falling below the first threshold; receive a first signal from a controller that indicates that the voltage level of the power source has fallen below the first voltage level threshold and that the first selected action has been taken by the controller; receive a second signal from the controller that indicates that the voltage level of the power source has risen above the first voltage level threshold and has remained above the first voltage level for the duration of at least a debounce period after falling below the first voltage level; and signal the controller to undo the first selected action based on the current voltage level of the power source rising above the first voltage level threshold.

The above example of an apparatus in which the apparatus includes the power source, and the power source includes a battery.

Either of the above examples of an apparatus in which the first signal includes an interrupt signal.

Any of the above examples of an apparatus in which the first selected action includes the controller acting to reduce an amount of electric power consumed by a first component that provides a first feature while still enabling provision of the first feature, and the main processor circuit is caused to alter the provision of the first feature based on receipt of the first signal.

Any of the above examples of an apparatus in which the first component includes a clock circuit that provides a clock signal to the main processor circuit, and the first selected action includes one of the controller signaling the clock circuit to reduce a frequency of the clock signal and the controller acting to reduce a voltage level of electric power provided to one of the clock circuit and the main processor circuit.

Any of the above examples of an apparatus in which the configuration data specifies a second voltage level threshold lower than the first voltage level threshold and a second selected action for the controller to take in response to the voltage level of the power source falling below the second threshold; and the main processor circuit is caused to receive a third signal from the controller that indicates that the voltage level of the power source has fallen below the second voltage level threshold and that the second selected action has been taken by the controller, and present a notice of a status of the power source and that the second selected action has been taken.

Any of the above examples of an apparatus in which the first selected action includes the controller acting to reduce an amount of electric power consumed by a first component that provides a first feature while still enabling provision of the first feature, and the second selected action includes the controller acting to cease provision of electric power to the first component to disable provision of the first feature.

An example of another at least one machine-readable storage medium includes instructions that when executed by a main processor circuit of the computing device, cause the main processor circuit to transmit configuration data to a controller of the computing device that controls distribution of electric power provided by a power source of the computing device, the configuration data specifying a first voltage level threshold and a first selected action for the controller to take to conserve electric power in response to a voltage level of the power source falling below the first threshold; receive a first signal from a controller that indicates that the voltage level of the power source has fallen below the first voltage level threshold and that the first selected action has been taken by the controller; receive a second signal from the controller that indicates that the voltage level of the power source has risen above the first voltage level threshold and has remained above the first voltage level for the duration of at least a debounce period after falling below the first voltage level; and signal the controller to undo the first selected action based on the current voltage level of the power source rising above the first voltage level threshold.

The above example of another at least one machine-readable storage medium in which the first selected action includes the controller acting to reduce an amount of electric power consumed by a first component that provides a first feature while still enabling provision of the first feature, and the main processor circuit is caused to alter the provision of the first feature based on receipt of the first signal.

Either of the above examples of another at least one machine-readable storage medium in which the configuration data specifies a second voltage level threshold lower than the first voltage level threshold and a second selected action for the controller to take in response to the voltage level of the power source falling below the second threshold; and the main processor circuit is caused to receive a third signal from the controller that indicates that the voltage level of the power source has fallen below the second voltage level threshold and that the second selected action has been taken by the controller and present a notice of a status of the power source and that the second selected action has been taken.

An example of another apparatus includes a main processor circuit; and a controller to control distribution of electric power provided by a power source and including logic to receive configuration data from the main processor circuit, the configuration data specifying first and second voltage level thresholds, and first and second selected actions for the controller to take to conserve electric power in response to the voltage level of the power source falling below the first and second voltage level thresholds, respectively, the first voltage level threshold specified as higher than the second; based on the voltage level of the power source falling below the first voltage level threshold, take the first selected action, and transmit a first signal to the main processor circuit that indicates that the voltage level of the power source has fallen below the first voltage level threshold and the first selected action has been taken; and based on the voltage level of the power source falling below the second voltage level threshold, take the second selected action, and transmit a second signal to the main processor circuit that indicates that the voltage level of the power source has fallen below the second voltage level threshold and the second selected action has been taken.

The above example of another apparatus in which the apparatus includes the power source, and the power source includes a battery.

Either of the above examples of another apparatus in which the first selected action includes the logic acting to reduce an amount of electric power consumed by a first component that provides a first feature while still enabling provision of the first feature, and the second selected action includes the logic acting to cease provision of electric power to the first component to disable provision of the first feature.

Any of the above examples of another apparatus in which a power switching component operable by the controller to control provision of electric power to the first component, the first selected action comprising the logic operating the power switching component to reduce provision of electric power to the first component, and the second selected action includes the logic operating the power switching component to cease provision of electric power to the first component.

Any of the above examples of another apparatus in which the first selected action includes the logic causing the controller to signal the first component to reduce its consumption of electric power to provide the first feature, and the second selected action comprising the logic causing the controller to signal the second component to cease its consumption of electric power to provide the first feature.

Any of the above examples of another apparatus in which the main processor circuit is to transmit the configuration data to the controller, receive the first signal from a controller, and receive the second signal from the controller.

Any of the above examples of another apparatus in which the logic is to, based on the voltage level of the power source rising above one of the first and second voltage level thresholds, transmit a third signal to the main processor circuit that indicates that the voltage level of the power source has risen above one of the first and second voltage level thresholds.

Any of the above examples of another apparatus in which the main processor circuit is to signal the controller to undo one of the first and second selected actions based on the third signal.

The invention claimed is:

1. A controller comprising: logic, at least a portion of which is implemented in hardware, to:
    receive configuration data from a main processor circuit that specifies a first voltage level threshold and a first selected action to take to reduce electric power provided to a first component to provide a first feature in response to a voltage level of a power source falling below the first voltage level threshold;
    based on the voltage level of the power source falling below the first voltage level threshold, take the first selected action, and transmit a signal to the main processor circuit that indicates that the voltage level of the power source has fallen below the first voltage level threshold and the first selected action has been taken; based on the voltage level of the power source rising above the first voltage level threshold after falling below the first voltage level threshold, await a debounce period and transmit a signal to the main processor circuit that indicates that the voltage level of the power source has risen above the first voltage level threshold; and
    receive a signal from the main processor circuit to undo the first selected action.

2. The controller of claim 1, the logic to:
    act to undo the first selected action.

3. The controller of claim 1, the configuration data specifying a second voltage level threshold lower than the first voltage level threshold and a second selected action for the controller to take to conserve electric power in response to the voltage level of a power source falling below the second voltage level threshold; and
    the logic to take the second selected action and transmit a signal to the main processor circuit that indicates that the voltage level of the power source has fallen below the second voltage level threshold and the second selected action has been taken based on the voltage level of the power source falling below the second voltage level threshold.

4. The controller of claim 3, the first selected action comprising the logic acting to reduce an amount of electric power consumed by the first component while still enabling the first component to provide the first feature, and the second selected action comprising the logic acting to cease provision of electric power to the first component to disable provision of the first feature.

5. The controller of claim 4, the controller comprising a power switching component to control provision of electric power to the first component, the first selected action comprising the logic operating the power switching component to reduce provision of electric power to the first component, the second selected action comprising the logic operating the power switching component to cease provision of electric power to the first component, and the first component comprising one of a camera comprising a flash, a vibration motor, an audio subsystem comprising an audio amplifier, a graphics interface conveying electric power to support a backlight of a display, and an interface controller comprising a wireless transceiver.

6. The controller of claim 4, the first selected action comprising the logic signaling the first component to reduce its consumption of electric power to provide the first feature, the second selected action comprising the logic signaling the second component to cease its consumption of electric power to provide the first feature, and the first component comprising one of a camera comprising a flash, a vibration motor, an audio subsystem comprising an audio amplifier, a graphics interface conveying electric power to support a backlight of a display, an interface controller comprising a wireless transceiver, a clock circuit that provides a clock signal to the main processor circuit.

7. The controller of claim 1, the logic to:
receive a signal from a second component that indicates that the second component is consuming a relatively high amount of electric power from the power source;
receive a signal from the first component that indicates that the first component is imminently about to consume a relatively high amount of electric power from the power source; and
based on the voltage level of the power source falling below the first voltage level threshold and the signal from the second component indicating it is consuming a relatively high amount of electric power, signal the first component to refrain from consuming a relatively high amount of electric power as the first selected action.

8. At least one machine-readable storage medium comprising instructions that when executed by a controller, cause the controller to:
receive configuration data from a main processor circuit that specifies a first voltage level threshold and a first selected action to take to reduce electric power provided to a first component to provide a first feature in response to a voltage level of a power source falling below the first voltage level threshold;
based on the voltage level of the power source falling below the first voltage level threshold, take the first selected action, and transmit a signal to the main processor circuit that indicates that the voltage level of the power source has fallen below the first voltage level threshold and the first selected action has been taken;
based on the voltage level of the power source rising above the first voltage level threshold after falling below the first voltage level threshold, await a debounce period and transmit a signal to the main processor circuit that indicates that the voltage level of the power source has risen above the first voltage level threshold; and
receive a signal from the main processor circuit to undo the first selected action.

9. The at least one machine-readable storage medium of claim 8, the controller caused to:
act to undo the first selected action.

10. The at least one machine-readable storage medium of claim 8, the configuration data specifying a second voltage level threshold lower than the first voltage level threshold and a second selected action for the controller to take to conserve electric power in response to the voltage level of a power source falling below the second voltage level threshold; the controller caused to take the second selected action and transmit a signal to the main processor circuit that indicates that the voltage level of the power source has fallen below the second voltage level threshold and the second selected action has been taken based on the voltage level of the power source falling below the second voltage level threshold.

11. The at least one machine-readable storage medium of claim 10, the first selected action comprising the logic acting to reduce an amount of electric power consumed by the first component while still enabling the first component to provide the first feature, and the second selected action comprising the logic acting to cease provision of electric power to the first component to disable provision of the first feature.

12. The at least one machine-readable storage medium of claim 8, the controller caused to:
receive a signal from a second component that indicates that the second component is consuming a relatively high amount of electric power from the power source;
receive a signal from the first component that indicates that the first component is imminently about to consume a relatively high amount of electric power from the power source; and
based on the voltage level of the power source falling below the first voltage level threshold and the signal from the second component indicating it is consuming a relatively high amount of electric power, signal the first component to refrain from consuming a relatively high amount of electric power as the first selected action.

13. An apparatus comprising: a main processor circuit and logic to:
transmit configuration data to a controller that controls distribution of electric power provided by a power source, the configuration data specifying a first voltage level threshold and a first selected action for the controller to take to conserve electric power in response to a voltage level of the power source falling below the first threshold;
receive a first signal from a controller that indicates that the voltage level of the power source has fallen below the first voltage level threshold and that the first selected action has been taken by the controller;
receive a second signal from the controller that indicates that the voltage level of the power source has risen above the first voltage level threshold and has remained above the first voltage level for the duration of at least a debounce period after falling below the first voltage level; and
signal the controller to undo the first selected action based on the current voltage level of the power source rising above the first voltage level threshold.

14. The apparatus of claim 13, comprising the power source, the power source comprising a battery.

15. The apparatus of claim 13, the first signal comprising an interrupt signal.

16. The apparatus of claim 13, the first selected action comprising the controller acting to reduce an amount of electric power consumed by a first component that provides a first feature while still enabling provision of the first feature, and the main processor circuit caused to alter the provision of the first feature based on receipt of the first signal.

17. The apparatus of claim 16, the first component comprising a clock circuit that provides a clock signal to the main processor circuit, the first selected action comprising one of the controller signaling the clock circuit to reduce a frequency of the clock signal and the controller acting to reduce a voltage level of electric power provided to one of the clock circuit and the main processor circuit.

18. The apparatus of claim 13, the configuration data specifying a second voltage level threshold lower than the first voltage level threshold and a second selected action for the controller to take in response to the voltage level of the power source falling below the second threshold; and the main processor circuit caused to:
receive a third signal from the controller that indicates that the voltage level of the power source has fallen below the second voltage level threshold and that the second selected action has been taken by the controller; and
present a notice of a status of the power source and that the second selected action has been taken.

19. The apparatus of claim 18, the first selected action comprising the controller acting to reduce an amount of electric power consumed by a first component that provides a first feature while still enabling provision of the first feature, and the second selected action comprising the controller acting to cease provision of electric power to the first component to disable provision of the first feature.

20. At least one machine-readable storage medium comprising instructions that when executed by a main processor circuit of the computing device, cause the main processor circuit to:
transmit configuration data to a controller of the computing device that controls distribution of electric power provided by a power source of the computing device, the configuration data specifying a first voltage level threshold and a first selected action for the controller to take to conserve electric power in response to a voltage level of the power source falling below the first threshold;
receive a first signal from a controller that indicates that the voltage level of the power source has fallen below the first voltage level threshold and that the first selected action has been taken by the controller;
receive a second signal from the controller that indicates that the voltage level of the power source has risen above the first voltage level threshold and has remained above the first voltage level for the duration of at least a debounce period after falling below the first voltage level; and
signal the controller to undo the first selected action based on the current voltage level of the power source rising above the first voltage level threshold.

21. The at least one machine-readable storage medium of claim 20, the first selected action comprising the controller acting to reduce an amount of electric power consumed by a first component that provides a first feature while still enabling provision of the first feature, and the main processor circuit caused to alter the provision of the first feature based on receipt of the first signal.

22. The at least one machine-readable storage medium of claim 20, the configuration data specifying a second voltage level threshold lower than the first voltage level threshold and a second selected action for the controller to take in response to the voltage level of the power source falling below the second threshold; and the main processor circuit caused to:
receive a third signal from the controller that indicates that the voltage level of the power source has fallen below the second voltage level threshold and that the second selected action has been taken by the controller; and
present a notice of a status of the power source and that the second selected action has been taken.

23. An apparatus comprising:
a main processor circuit; and
a controller to control distribution of electric power provided by a power source and comprising logic to:
receive configuration data from the main processor circuit, the configuration data specifying first and second voltage level thresholds, and first and second selected actions for the controller to take to conserve electric power in response to the voltage level of the power source falling below the first and second voltage level thresholds, respectively, the first voltage level threshold specified as higher than the second;
based on the voltage level of the power source falling below the first voltage level threshold, take the first selected action, and transmit a first signal to the main processor circuit that indicates that the voltage level of the power source has fallen below the first voltage level threshold and the first selected action has been taken;
based on the voltage level of the power source falling below the second voltage level threshold, take the second selected action, and transmit a second signal to the main processor circuit that indicates that the voltage level of the power source has fallen below the second voltage level threshold and the second selected action has been taken; and
based on the voltage level of the power source rising above one of the first and second voltage level thresholds, transmit a third signal to the main processor circuit that indicates that the voltage level of the power source has risen above one of the first and second voltage level thresholds;
the main processor circuit to signal the controller to undo one of the first and second selected actions based on the third signal.

24. The apparatus of claim 23, comprising the power source, the power source comprising a battery.

25. The apparatus of claim 23, the first selected action comprising the logic acting to reduce an amount of electric power consumed by a first component that provides a first feature while still enabling provision of the first feature, and the second selected action comprising the logic acting to cease provision of electric power to the first component to disable provision of the first feature.

26. The apparatus of claim 25, comprising a power switching component operable by the controller to control provision of electric power to the first component, the first selected action comprising the logic operating the power switching component to reduce provision of electric power to the first component, and the second selected action comprising the logic operating the power switching component to cease provision of electric power to the first component.

27. The apparatus of claim 25, the first selected action comprising the logic causing the controller to signal the first component to reduce its consumption of electric power to provide the first feature, and the second selected action comprising the logic causing the controller to signal the second component to cease its consumption of electric power to provide the first feature.

28. The apparatus of claim 23, the main processor circuit to:
transmit the configuration data to the controller;
receive the first signal from a controller; and
receive the second signal from the controller.

* * * * *